United States Patent
Green

(10) Patent No.: US 10,200,993 B2
(45) Date of Patent: Feb. 5, 2019

(54) TECHNIQUES FOR PERFORMING A DISTRIBUTED CHANNEL AVAILABILITY CHECK IN A SHARED RADIO FREQUENCY SPECTRUM BAND

(71) Applicant: QUALCOMM Incorporated, San Diego, CA (US)

(72) Inventor: Michael Richard Green, Needham, MA (US)

(73) Assignee: QUALCOMM Incorporated, San Diego, CA (US)

(*) Notice: Subject to any disclaimer, the term of this patent is extended or adjusted under 35 U.S.C. 154(b) by 126 days.

(21) Appl. No.: 15/143,087

(22) Filed: Apr. 29, 2016

(65) Prior Publication Data
US 2017/0318583 A1 Nov. 2, 2017

(51) Int. Cl.
| | |
|---|---|
| *H04W 16/14* | (2009.01) |
| *H04W 24/08* | (2009.01) |
| *H04W 72/04* | (2009.01) |
| *H04W 4/02* | (2018.01) |

(52) U.S. Cl.
CPC ......... *H04W 72/0453* (2013.01); *H04W 4/02* (2013.01); *H04W 16/14* (2013.01); *H04W 24/08* (2013.01)

(58) Field of Classification Search
CPC ............. H04W 72/0453; H04W 24/08; H04W 76/025; H04W 88/08
See application file for complete search history.

(56) References Cited

U.S. PATENT DOCUMENTS

| | | | |
|---|---|---|---|
| 7,606,193 B2 | 10/2009 | McFarland et al. | |
| 7,813,701 B2* | 10/2010 | Strong | H04L 27/2608 455/114.2 |
| 7,986,928 B2* | 7/2011 | Rokusek | H04B 1/034 455/150.1 |
| 8,081,615 B2 | 12/2011 | Uln et al. | |
| 8,238,268 B1* | 8/2012 | Shmidt | H04W 4/20 370/254 |
| 8,400,938 B2 | 3/2013 | Matsuura | |
| 8,542,646 B1* | 9/2013 | Ding | H04W 72/02 340/870.04 |

(Continued)

OTHER PUBLICATIONS

Hu W., et al., "Dynamic Frequency Hopping Communities for Efficient IEEE 802.22 Operation," IEEE Communications Magazine, May 2007, pp. 80-87.

(Continued)

*Primary Examiner* — Rasheed Gidado
(74) *Attorney, Agent, or Firm* — Dalei Dong; Holland & Hart

(57) ABSTRACT

Techniques are described for wireless communication at a wireless communication device. One method includes determining an availability of a sub-band of a shared radio frequency spectrum band during a first portion of a distributed channel availability check (CAC); receiving at least one indication that the sub-band is available during remaining portions of the distributed CAC; and communicating over the sub-band based at least in part on determining the sub-band is available during the first portion of the distributed CAC and the at least one indication that the sub-band is available during remaining portions of the distributed CAC.

30 Claims, 14 Drawing Sheets

(56) References Cited

U.S. PATENT DOCUMENTS

| | | | | |
|---|---|---|---|---|
| 8,818,293 | B2* | 8/2014 | Zhou | H04W 72/082 455/434 |
| 9,774,415 | B2* | 9/2017 | Hassan | H04J 11/003 |
| 2005/0174966 | A1* | 8/2005 | Lansford | H04L 5/023 370/329 |
| 2007/0258404 | A1* | 11/2007 | Tirkkonen | H04L 47/14 370/329 |
| 2009/0044244 | A1* | 2/2009 | Chang | H04N 5/4401 725/131 |
| 2009/0161774 | A1* | 6/2009 | Liu | H04L 5/0044 375/260 |
| 2010/0303024 | A1* | 12/2010 | Gossain | H04W 72/04 370/329 |
| 2012/0275354 | A1* | 11/2012 | Villain | H04L 27/0006 370/281 |
| 2014/0378179 | A1* | 12/2014 | Nagai | H04W 16/14 455/509 |
| 2015/0334751 | A1* | 11/2015 | Alanen | H04W 48/16 370/329 |
| 2015/0382287 | A1* | 12/2015 | Kim | H04W 76/023 370/338 |
| 2016/0249357 | A1* | 8/2016 | Green | H04W 24/08 |
| 2017/0063665 | A1* | 3/2017 | Casebolt | H04L 43/16 |
| 2017/0181190 | A1* | 6/2017 | Aryafar | H04W 74/0816 |

OTHER PUBLICATIONS

Paisana F., et al., "Radar, TV and Cellular Bands: Which Spectrum Access Techniques for Which Bands?," IEEE Communications Surveys & Tutorials, Third Quarter 2014, vol. 16 (3), pp. 1193-1220, XP011557068, DOI.

ISA/EP, International Search Report and Written Opinion of the International Searching Authority, Int'l Application No. PCT/US2017/025763, Sep. 13, 2017, European Patent Office, Rijswijk, NL, 13 pgs.

Mukherjee et al., "System Architecture and Coexistence Evaluation of Licensed-Assisted Access LTE with IEEE 802.11," 2015 1EEE International Conference on Communication Workshop (ICCW), Jun. 12, 2015, pp. 2350-2355, XP002773250, ISSN: 2164-7038, DOI: 10.1109/ICCW.2015.7247532, Institute of Electrical and Electronics Engineers.

Ren et al., "Cellular Communications on License-Exempt Spectrum: A Tutorial," Jan. 15, 2016, 13 pgs., XP002773251, Retrieved from the Internet: URL:https://arxiv.org/abs/1601.03829 [retrieved on Aug. 25, 2017].

* cited by examiner

TECHNIQUES FOR PERFORMING A DISTRIBUTED CHANNEL AVAILABILITY CHECK IN A SHARED RADIO FREQUENCY SPECTRUM BAND

BACKGROUND

Field of the Disclosure

The present disclosure, for example, relates to wireless communication systems, and more particularly to techniques for performing a distributed channel availability check (CAC) in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of network access devices (e.g., base stations or small cells), each simultaneously supporting communication for multiple communication devices, otherwise known as user equipment (UEs). A network access device may communicate with UEs on downlink channels (e.g., for transmissions from the network access device to the UEs) and uplink channels (e.g., for transmissions from a UE to the network access device).

Network access devices and UEs may communicate over one or more radio frequency spectrum bands, including one or more dedicated radio frequency spectrum bands and/or one or more shared radio frequency spectrum bands. In some cases, a wireless device (e.g., a network access device or UE) may need to perform a Listen Before Talk (LBT) procedure such as a clear channel assessment (CCA) procedure, extended CCA procedure, or channel availability check (CAC) before communicating with another wireless device over a sub-band of a shared radio frequency spectrum band. One sub-band available to network access devices and UEs is the 5.600-5.650 Gigahertz (GHz) sub-band used by Terminal Doppler Weather Radars (TDWRs). The 5.600-5.650 GHz sub-band is in a shared radio frequency spectrum band. European-based Dynamic Frequency Selection (DFS) rules require a wireless device to perform a lengthy 10 minute CAC before communicating in the 5.600-5.650 GHz sub-band. Many wireless devices are unable (or not configured) to cease wireless communication for 10 minutes while performing the 10 minute CAC, and thus, the 5.600-5.650 GHz is underutilized by network access devices and UEs.

SUMMARY

Techniques for performing a distributed CAC in a shared radio frequency spectrum band are described. The distributed CAC may be associated with a sub-band of the shared radio frequency spectrum band. A central node, network access device (e.g., a base station or small cell), UE or other management node may identify a plurality of small cells or other wireless devices within a geographic area (e.g., based at least in part on location-based metrics), and may manage the performance of the distributed CAC by assigning different portions of the distributed CAC to different wireless devices. For example, the management node may assign a first portion of the distributed CAC to a first wireless device, a second portion of the distributed CAC to a second wireless device, and so on. The number of wireless devices that perform portions of the distributed CAC may vary, and may be based on parameters such as the duration of the distributed CAC, the number of identified wireless devices capable of performing portions of the distributed CAC, utilization characteristics (e.g., lower utilization) of some of the wireless devices, etc. The portions of the distributed CAC may be overlapping or contiguous in time.

In some examples, the management node may communicate the assigned portions of the distributed CAC to respective wireless devices prior to commencing the distributed CAC. In other examples, the management node may communicate an assignment of a first portion of the distributed CAC to a first wireless device, and then communicate (or assign and then communicate) a next assigned portion of the distributed CAC, to a next wireless device, after part of the first portion of the distributed CAC is successfully performed (e.g., a next portion of the distributed CAC may not be assigned to a next wireless device unless it appears likely that the current portion of the distributed CAC is going to be successfully completed). When the management node receives indications that the sub-band of the shared radio frequency spectrum band is available during all portions of the distributed CAC, the management node, the wireless devices that performed portions of the distributed CAC, and/or other wireless devices within the geographic area may be allowed to communicate over the sub-band. The distributed CAC reduces the amount of time that any one wireless device needs to cease wireless communication to comply with a CAC requirement.

In one example, a method for wireless communication at a wireless device is described. The method may include determining an availability of a sub-band of a shared radio frequency spectrum band during a first portion of a distributed CAC; receiving at least one indication that the sub-band is available during remaining portions of the distributed CAC; and communicating over the sub-band based at least in part on determining the sub-band is available during the first portion of the distributed CAC and the at least one indication that the sub-band is available during remaining portions of the distributed CAC.

In some examples, the method may include monitoring an energy level of the sub-band for a period of time corresponding to the first portion of the distributed CAC, and determining the availability of the sub-band based at least in part on the monitoring. In some examples, the method may include determining the sub-band is unavailable during the first portion of the distributed CAC, and discontinuing the monitoring based at least in part on the determining the sub-band is unavailable. In some examples, the method may include receiving an indication the sub-band is determined available during at least a second portion of the distributed CAC. In some examples, the indication the sub-band is determined available during at least the second portion of the distributed CAC may be received from a network access device.

In one example, a method for wireless communication is described. The method may include assigning a first portion of a distributed CAC to a first wireless device of a plurality of wireless devices; communicating the assignment of the first portion of the distributed CAC to the first wireless device; and communicating over the sub-band based at least in part on receiving an indication the sub-band is determined available during the first portion of the distributed CAC and determining the sub-band is available during remaining portions of the distributed CAC. The distributed CAC may be associated with a sub-band of a shared radio frequency spectrum band.

In some examples, the method may include determining a duration of the first portion of the distributed CAC based at least in part on: a first number of wireless devices in the plurality of wireless devices, or a second number of wireless devices in the plurality of wireless devices capable of performing a portion of the distributed CAC, or a maximum number of wireless devices for performing the distributed CAC. In some examples, the method may include receiving an indication the sub-band is unavailable during a portion of the distributed CAC, and flagging the sub-band unavailable for a period of time. In some examples, the method may include assigning the first portion of the distributed CAC to the first wireless device based at least in part on a utilization characteristic of the first wireless device.

In some examples, the method may include assigning a second portion of the distributed CAC to a second wireless device of the plurality of wireless devices. In some examples, the second portion of the distributed CAC may overlap the first portion of the distributed CAC in time. In some examples, the second portion of the distributed CAC may be contiguous with the first portion of the distributed CAC in time. In some examples, the method may include communicating the assignment of the second portion of the distributed CAC to the second wireless device after communicating the assignment of the first portion of the distributed CAC to the first wireless device.

In some examples, the method may include identifying the plurality of wireless devices within a geographic area based at least in part on location-based metrics for the plurality of wireless devices. In some examples, the method may include performing a second portion of the distributed CAC. In some examples, the assignment of the first portion of the distributed CAC may be communicated to the first wireless device over a dedicated radio frequency spectrum band. In some examples, the first portion of the distributed CAC and the remaining portions of the distributed CAC may be associated with one of: a same duration, or at least two different durations.

In one example, an apparatus for wireless communication is described. The apparatus may include a processor, and memory in electronic communication with the processor. The processor and the memory may be configured to determine an availability of a sub-band of a shared radio frequency spectrum band during a first portion of a distributed CAC; to receive at least one indication that the sub-band is available during remaining portions of the distributed CAC; and to communicate over the sub-band based at least in part on determining the sub-band is available during the first portion of the distributed CAC and the at least one indication that the sub-band is available during remaining portions of the distributed CAC.

In some examples of the apparatus, the processor and the memory may be configured to monitor an energy level of the sub-band for a period of time corresponding to the first portion of the distributed CAC, and to determine the availability of the sub-band based at least in part on the monitoring. In some examples, the processor and the memory may be configured to determine the sub-band is unavailable during the first portion of the distributed CAC, and to discontinue the monitoring based at least in part on the determining the sub-band is unavailable. In some examples, the processor and the memory may be configured to receive an indication the sub-band is determined available during at least a second portion of the distributed CAC. In some examples, the indication the sub-band is determined available during at least the second portion of the distributed CAC may be received from a network access device.

In one example, an apparatus for wireless communication is described. The apparatus may include a processor, and memory in electronic communication with the processor. The processor and the memory may be configured to assign a first portion of a distributed CAC to a first wireless device of a plurality of wireless devices; to communicate the assignment of the first portion of the distributed CAC to the first wireless device; and to communicate over the sub-band based at least in part on receiving an indication the sub-band is determined available during the first portion of the distributed CAC and determining the sub-band is available during remaining portions of the distributed CAC. The distributed CAC may be associated with a sub-band of a shared radio frequency spectrum band.

In some examples of the apparatus, the processor and the memory may be configured to determine a duration of the first portion of the distributed CAC based at least in part on: a first number of wireless devices in the plurality of wireless devices, or a second number of wireless devices in the plurality of wireless devices capable of performing a portion of the distributed CAC, or a maximum number of wireless devices for performing the distributed CAC. In some examples, the processor and the memory may be configured to receive an indication the sub-band is unavailable during a portion of the distributed CAC, and to flag the sub-band unavailable for a period of time. In some examples, the processor and the memory may be configured to assign the first portion of the distributed CAC to the first wireless device based at least in part on a utilization characteristic of the first wireless device.

In some examples of the apparatus, the processor and the memory may be configured to assign a second portion of the distributed CAC to a second wireless device of the plurality of wireless devices. In some examples, the second portion of the distributed CAC may overlap the first portion of the distributed CAC in time. In some examples, the second portion of the distributed CAC may overlap the portion of the distributed CAC in time. In some examples, the processor and the memory may be configured to communicate the assignment of the second portion of the distributed CAC to the second wireless device after communicating the assignment of the first portion of the distributed CAC to the first wireless device.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques for performing a distributed CAC in a shared radio frequency spectrum band are described. The shared radio frequency spectrum band may, for example, include a radio frequency spectrum band available for Wi-Fi use, a radio frequency spectrum band available for use by different radio access technologies, or a radio frequency spectrum band available for use by different mobile network operators (MNOs) in an equally shared or prioritized manner.

Upon receiving an assignment of a portion of a distributed CAC, a wireless device may determine an availability of a sub-band of a shared radio frequency spectrum band during the portion of the distributed CAC, and may communicate, to a management node (e.g., a central node, network access device (e.g., base station or small cell), UE, or other management node), an indication of whether the sub-band is available during the portion of the distributed CAC. A wireless device may determine the availability of the sub-band by monitoring an energy level of the sub-band for a period of time corresponding to the portion of the distributed CAC.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
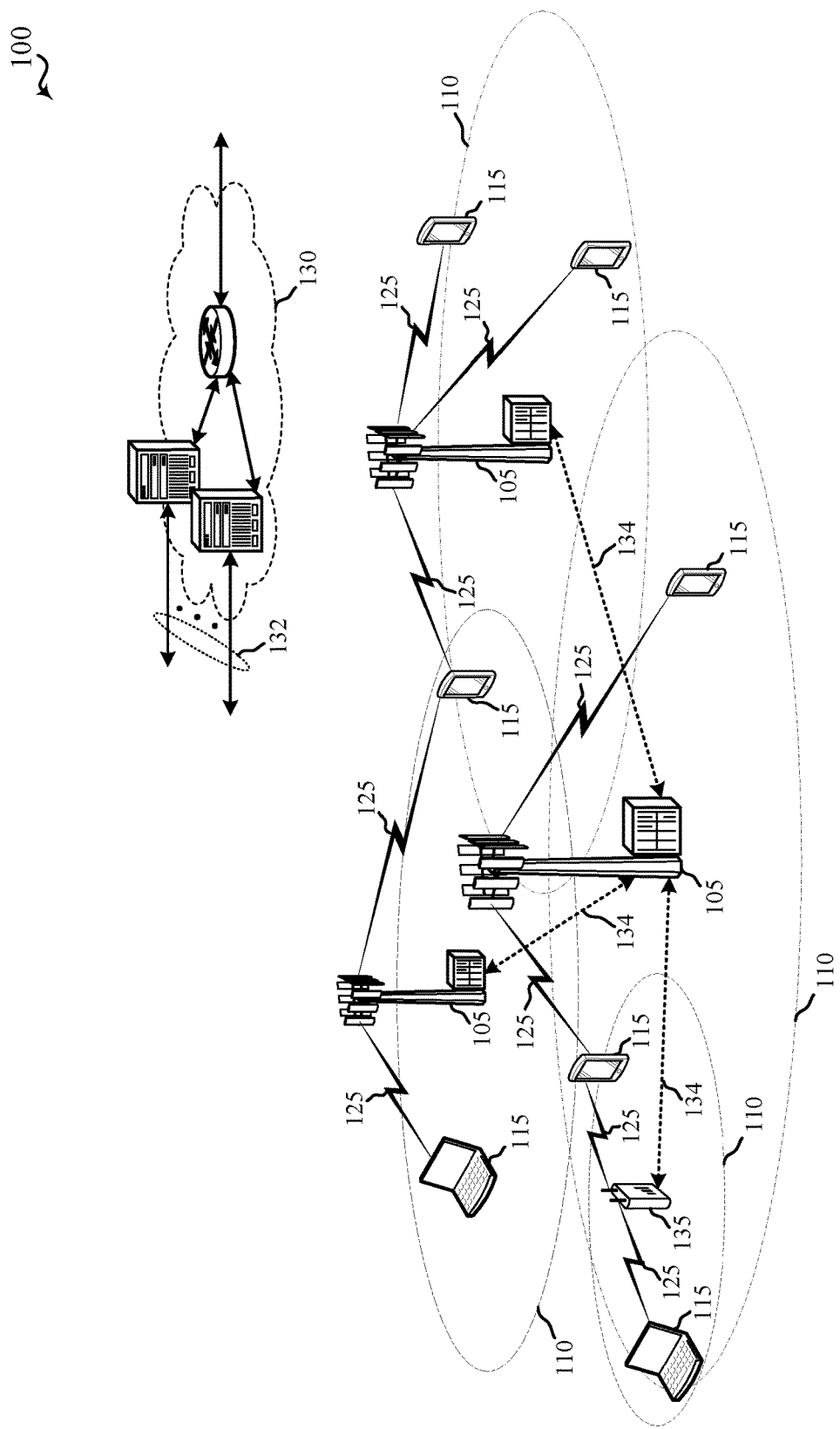
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include base stations 105, UEs 115, small cells 135 (e.g., a type of base station 105), and a core network 130. The core network 130 may provide user authentication, access authorization, tracking, Internet Protocol (IP) connectivity, and other access, routing, or mobility functions. The base stations 105 and small cells 135 may interface with the core network 130 through backhaul links 134 (e.g., S1, etc.) and may perform radio configuration and scheduling for communication with the UEs 115, or may operate under the control of a base station controller (not shown). In various examples, the base stations 105 or small cells 135 may communicate, either directly or indirectly (e.g., through core network 130), with each other over backhaul links 132 (e.g., X1, etc.), which may be wired or wireless communication links.

The base stations 105 or small cells 135 may wirelessly communicate with the UEs 115 via one or more base station or small cell antennas. Each of the base station 105 or small cells 135 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include a Long Term Evolution (LTE) or LTE-Advanced (LTE-A) network. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell 135 may be a lower-powered base station, as compared with a macro cell that may operate in the same or different (e.g., licensed, shared, etc.) radio frequency spectrum bands as macro cells. Small cells 135 may include pico cells, femto cells, and micro cells according to various examples. A pico cell may cover a relatively smaller geographic area and may allow unrestricted access by UEs with service subscriptions with the network provider. A femto cell, additionally or alternatively, may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell 135 may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations 105 and small cells 135 may have similar frame timing, and transmissions from different base stations 105 or small cells 135 may be approximately aligned in time. For asynchronous operation, the base stations 105 or small cells 135 may have different frame timing, and transmissions from different base stations 105 or small cells 135 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may, additionally or alternatively, use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105, small cells 135, or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may, additionally or alternatively, include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) channels, from a base station 105 or small cell 135 to a UE 115, or uplink (UL) channels, from a UE 115 to a base station 105 or small cell 135. The downlink channels may, additionally or alternatively, be referred to as forward link channels, while the uplink channels may, additionally or alternatively, be referred to as reverse link channels.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, small cells 135, or UEs 115 may include multiple antennas for employing antenna diversity schemes to improve communication quality and reliability between base stations 105, small cells 135, and UEs 115. Additionally or alternatively, base stations 105, small cells 135, or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may, additionally or alternatively, be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Additionally or alternatively, one of the CCs allocated to a UE 115 may be configured as a primary CC (PCC), and the remaining CCs allocated to the UE 115 may be configured as secondary CCs (SCCs).

In some examples, the wireless communication system 100 may support operation over a dedicated radio frequency spectrum band (e.g., a radio frequency spectrum band licensed to particular users for particular uses) or a shared radio frequency spectrum band (e.g., a radio frequency spectrum band that is available for Wi-Fi use, a radio frequency spectrum band that is available for use by different radio access technologies, or a radio frequency spectrum band that is available for use by multiple MNOs in an equally shared or prioritized manner). One sub-band of a shared radio frequency spectrum band is the 5.600-5.650 GHz TDWR sub-band. European-based DFS rules require a wireless device to perform a lengthy 10 minute CAC before communicating in the 5.600-5.650 GHz sub-band. Many wireless devices are unable (or not configured) to cease wireless communication for 10 minutes while performing the 10 minute CAC, and thus, the 5.600-5.650 GHz is underutilized.

A CAC may be performed by any wireless device, such as a network access device (e.g., a base station 105 or small cell 135) or UE 115. The present disclosure describes techniques for performing a distributed CAC, in which the duration of a CAC is divided into same or different size contiguous or overlapping portions, with different portions of the distributed CAC being performed by two or more wireless devices. A distributed CAC may reduce the amount of time that any one wireless device may have to cease communication during a CAC. In some examples, a management node (e.g., a base station 105 or small cell 135, a central node of the core network 130, or one of the UEs 115) may identify the wireless devices within a geographic area that are capable of performing a portion of a distributed CAC, assign portions of the distributed CAC to the wireless devices, and determine whether the distributed CAC is successfully performed and whether the sub-band for which the distributed CAC is performed may be used for communication in the geographic area.

Figure 2:
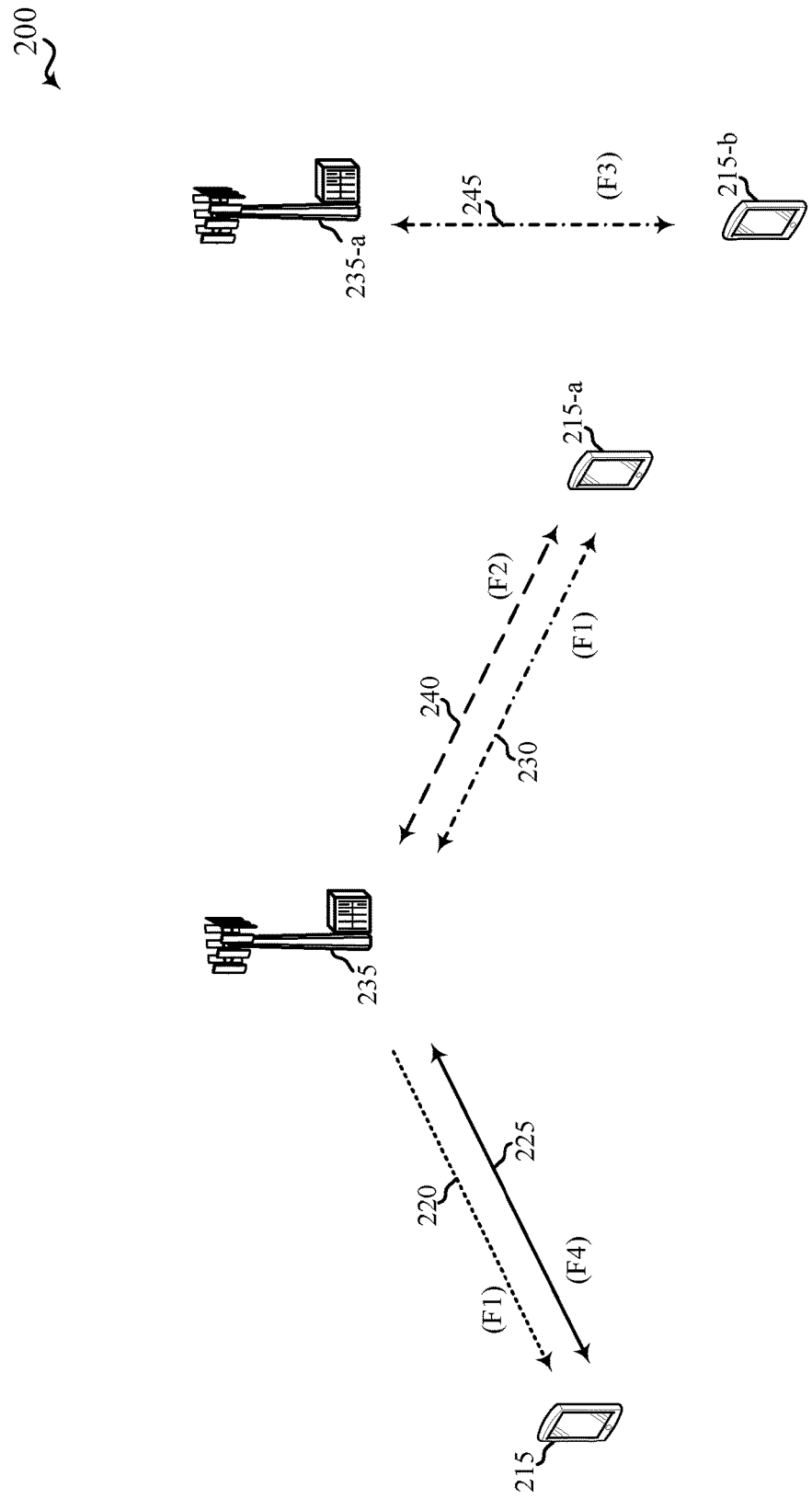
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a licensed assisted access mode), a carrier aggregation mode, and a standalone mode, in which LTE/LTE-A may be deployed using a shared radio frequency spectrum band. The wireless communication system 200 may be an example of portions of the wireless communication system 100 described with reference to FIG. 1. Moreover, a first small cell 235 and a second small cell 235-a may be examples of aspects of one or more of the small cells 135 or base stations 105 described with reference to FIG. 1, while a first UE 215, a second UE 215-a, and a third UE 215-b may be examples of aspects of one or more of the UEs 115 described with reference to FIG. 1.

In the example of the supplemental downlink mode (e.g., the licensed assisted access mode) in the wireless communication system 200, the first small cell 235 may transmit OFDMA waveforms to the first UE 215 using a downlink channel 220. The downlink channel 220 may be associated with a frequency F1 in a shared radio frequency spectrum band. The first small cell 235 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first small cell 235. In some examples, the downlink channel 220 may be used for unicast services (e.g., addressed to one UE) or for multicast services (e.g., addressed to several UEs). This scenario may occur with any service provider (e.g., a MNO) that uses a dedicated radio frequency spectrum band and needs to relieve some of the traffic or signaling congestion.

In the example of the carrier aggregation mode in the wireless communication system 200, the first small cell 235 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum band. The first small cell 235 may, additionally or alternatively, transmit OFDMA waveforms to the second UE 215-a using a third bidirectional link 240 and may receive SC-FDMA waveforms from the second UE 215-a using the third bidirectional link 240. The third bidirectional link 240 may be associated with a frequency F2 in a dedicated radio frequency spectrum band. The third bidirectional link 240 may provide a downlink and uplink capacity offload for the first small cell 235. Like the supplemental downlink mode (e.g., the licensed assisted access mode) described above, this scenario may occur with any service provider (e.g., MNO) that uses a dedicated radio frequency spectrum band and needs to relieve some of the traffic or signaling congestion.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink, carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225 or third bidirectional link 240) while data may, for example, be communicated in the shared radio frequency spectrum band (e.g., via second bidirectional link 230). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second small cell 235-a may transmit OFDMA waveforms to the third UE 215-b using a bidirectional link 245 and may receive OFDMA waveforms, SC-FDMA waveforms, or resource block interleaved FDMA waveforms from the third UE 215-b using the bidirectional link 245. The bidirectional link 245 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed spectrum.

In some examples, a transmitting apparatus such as one of the base stations 105 or small cells 135, 235, or 235-a described with reference to FIG. 1 or 2, or one of the UEs 115, 215, 215-*a*, or 215-*b* described with reference to FIG. 1 or 2, may use a gating interval to contend for access to a wireless channel of a shared radio frequency spectrum band (e.g., to a physical channel of the shared radio frequency spectrum band). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a sharing protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure or an extended CCA procedure. The outcome of the CCA procedure or extended CCA procedure may indicate to the transmitting apparatus whether a wireless channel of a shared radio frequency spectrum band is available or in use for the gating interval (e.g., an LBT radio frame or transmission burst). When a CCA procedure or extended CCA procedure indicates the wireless channel is available for a corresponding LBT radio frame or transmission burst (e.g., "clear" for use), the transmitting apparatus may reserve or use the wireless channel of the shared radio frequency spectrum band during part or all of the LBT radio frame. When a CCA procedure or extended CCA procedure indicates the wireless channel is not available (e.g., that the wireless channel is in use or reserved by another transmitting apparatus), the transmitting apparatus may be prevented from using the wireless channel during the LBT radio frame. In some examples, a transmitting apparatus may need to perform a CCA procedure or extended CCA procedure for some but not other wireless channels in a shared radio frequency spectrum band.

In some examples, a transmitting apparatus such as one of the base stations 105 or small cells 135, 235, or 235-*a* described with reference to FIG. 1 or 2, or one of the UEs 115, 215, 215-*a*, or 215-*b* described with reference to FIG. 1 or 2, may perform a CAC to contend for access to a wireless channel (or sub-band) of a shared radio frequency spectrum band (e.g., to a physical channel of the shared radio frequency spectrum band). For example, a transmitting apparatus may perform a CAC to contend for access to a TDWR channel. In some examples, a CAC may be performed by monitoring the energy level of a channel for a greater period of time than when performing a CCA procedure or an extended CCA procedure. For example, an energy level of a channel may be monitored for several microseconds when performing a CCA procedure or extended CCA procedure, and an energy level of a channel may be monitored for a few minutes (e.g., 10 minutes) when performing a CAC. However, upon successfully performing a CAC, a transmitting apparatus may use a channel for which the CAC was performed for minutes, hours, or days before performing another CAC for the channel.

Given the length of time that an energy level of a channel may need to be monitored when performing a CAC, a transmitting apparatus may be configured to avoid using a channel (or sub-band) for which a CAC needs to be performed.

Figure 3:
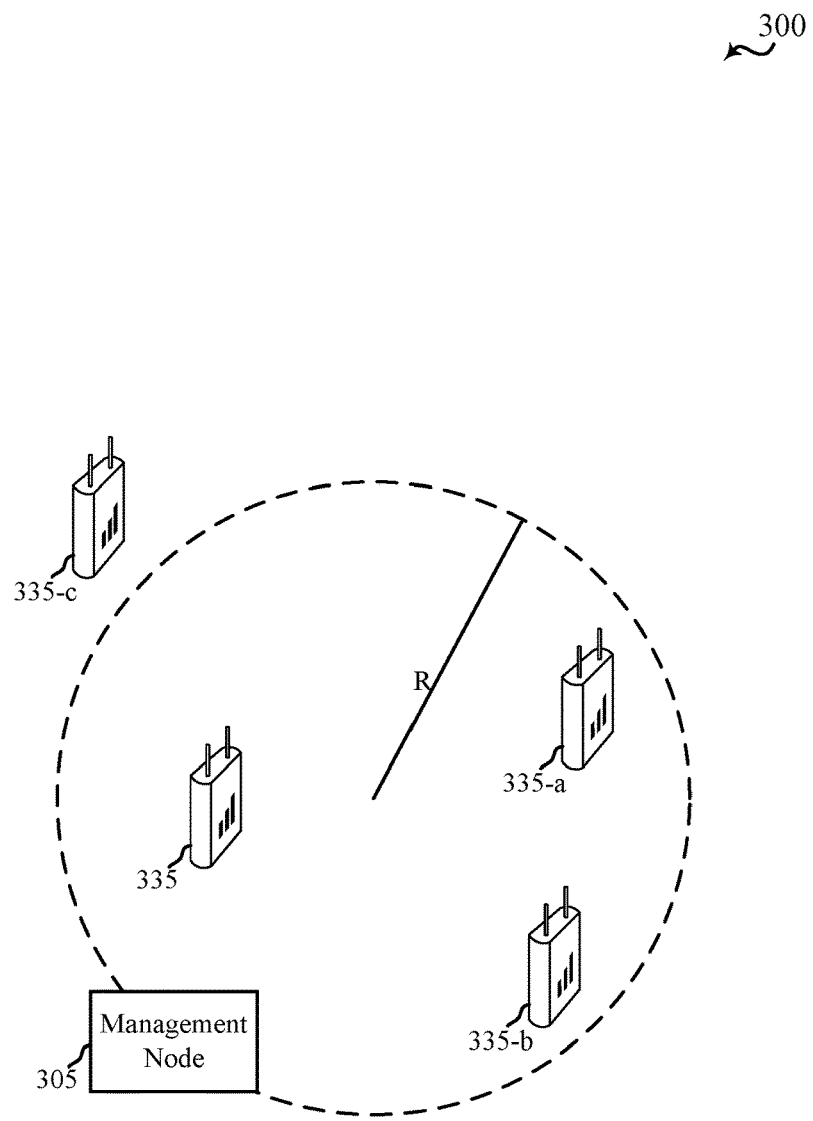
FIG. 3 shows a wireless communication system in which wireless communication devices are assigned portions of a distributed CAC, in accordance with various aspects of the present disclosure.

FIG. 3 shows a wireless communication system 300 in which wireless communication devices are assigned portions of a distributed CAC, in accordance with various aspects of the present disclosure. By way of example, a set of wireless communication devices (e.g., a management node 305, a first small cell 335, a second small cell 335-*a*, a third small cell 335-*b* and a fourth small cell 335-*c*) may be associated with a MNO. The first small cell 335, the second small cell 335-*a*, the third small cell 335-*b*, and the fourth small cell 335-*c* may be examples of aspects of the small cells 135, 235, or 235-*a* or base stations 105 described with reference to FIG. 1 or 2. The management node 305 may be an example of aspects of the base stations 105, UEs 115, 215, 215-*a*, or 215-*b*, small cells 135, 235, or 235-*a*, or a central node of the core network 130 described with reference to FIG. 1 or 2.

In some examples, the management node 305 may identify a plurality of small cells or other wireless devices within a geographic area (e.g., a first small cell 335, a second small cell 335-*a*, and a third small cell 335-*b*, etc. within a sphere of radius R). In some examples, the first small cell 335, the second small cell 335-*a*, and the third small cell 335-*b* may be determined to be within the geographic area based at least in part on location-based metrics collected at the management node 305. The management node 305 may or may not be located within the geographic area.

In some examples, the management node 305 may assign different portions of a distributed CAC (i.e., a CAC divided into same or different size portions, with two or more of the portions being performed at different times by different wireless devices) to different small cells within the geographic area. For example, a 10 minute CAC may be divided into three portions, and one portion may be assigned to each of the first small cell 335, the second small cell 335-*a*, and the third small cell 335-*b*. In some examples, a first portion of a distributed CAC may be assigned to the first small cell 335, a second portion of the distributed CAC may be assigned to the second small cell 335-*a*, and a third portion of the distributed CAC may be assigned to the third small cell 335-*b*. In some examples, the duration(s) of the first portion, second portion, and third portion may be based at least in part on the number of wireless devices identified within the geographic area determined by the radius R, the number of wireless devices capable of performing a portion of the distributed CAC, a maximum number of wireless devices that can perform the distributed CAC, etc. In some examples, the portions of the distributed CAC may be assigned to the first small cell 335, the second small cell 335-*a*, and the third small cell 335-*b* based at least in part on utilization characteristics of the small cells (e.g., the first portion of the distributed CAC may be assigned to the first small cell 335 based on the first small cell 335 being available at the start of the distributed CAC and the second small cell 335-*a* and third small cell 335-*b* being busy at the start of the distributed CAC). In some examples, the durations of different portions of the distributed CAC may also be configured based at least in part on utilization characteristics of the small cells. The portions of the distributed CAC may be contiguous or overlap (e.g., a next portion may overlap a current portion to at least sufficiently ensure that there are no gaps in monitoring during the distributed CAC).

In some examples, the management node 305 may communicate an assignment of the first portion of the distributed CAC to the first small cell 335, and then communicate (or assign and then communicate) the second portion of the distributed CAC to the second small cell 335-*a* after part of the first portion of the distributed CAC is successfully performed (e.g., a next portion of the distributed CAC may not be assigned to a next wireless device unless it appears likely that the current portion of the distributed CAC is going to be successfully completed).

In some examples, each of the small cells within the geographic area determined by the radius R (e.g., the first small cell 335, the second small cell 335-*a*, and the third small cell 335-*b*) may determine an availability of a sub-band of a shared radio frequency spectrum band during an assigned portion of the distributed CAC. Each small cell may indicate the success or failure of its assigned portion of the distributed CAC to the management node 305. When all of the portions of the distributed CAC are successfully performed (e.g., by each small cell determining that the sub-band is available), the management node 305 may provide the small cells an indication that communication over the sub-band is allowed. When one of the portions of the distributed CAC fails (e.g., because a small cell determines that the sub-band is unavailable), the management node 305 may flag the sub-band as unavailable and provide the small cells an indication that communication over the sub-band is not allowed.

The distributed CAC performed by the first small cell 335, the second small cell 335-*a*, and the third small cell 335-*b*, as managed by the management node 305, may reduce the period of time that each of the first small cell 335, the second small cell 335-*a*, and the third small cell 335-*b* needs to cease communication to monitor the energy level of the sub-band for which the CAC is performed.

Figure 4:
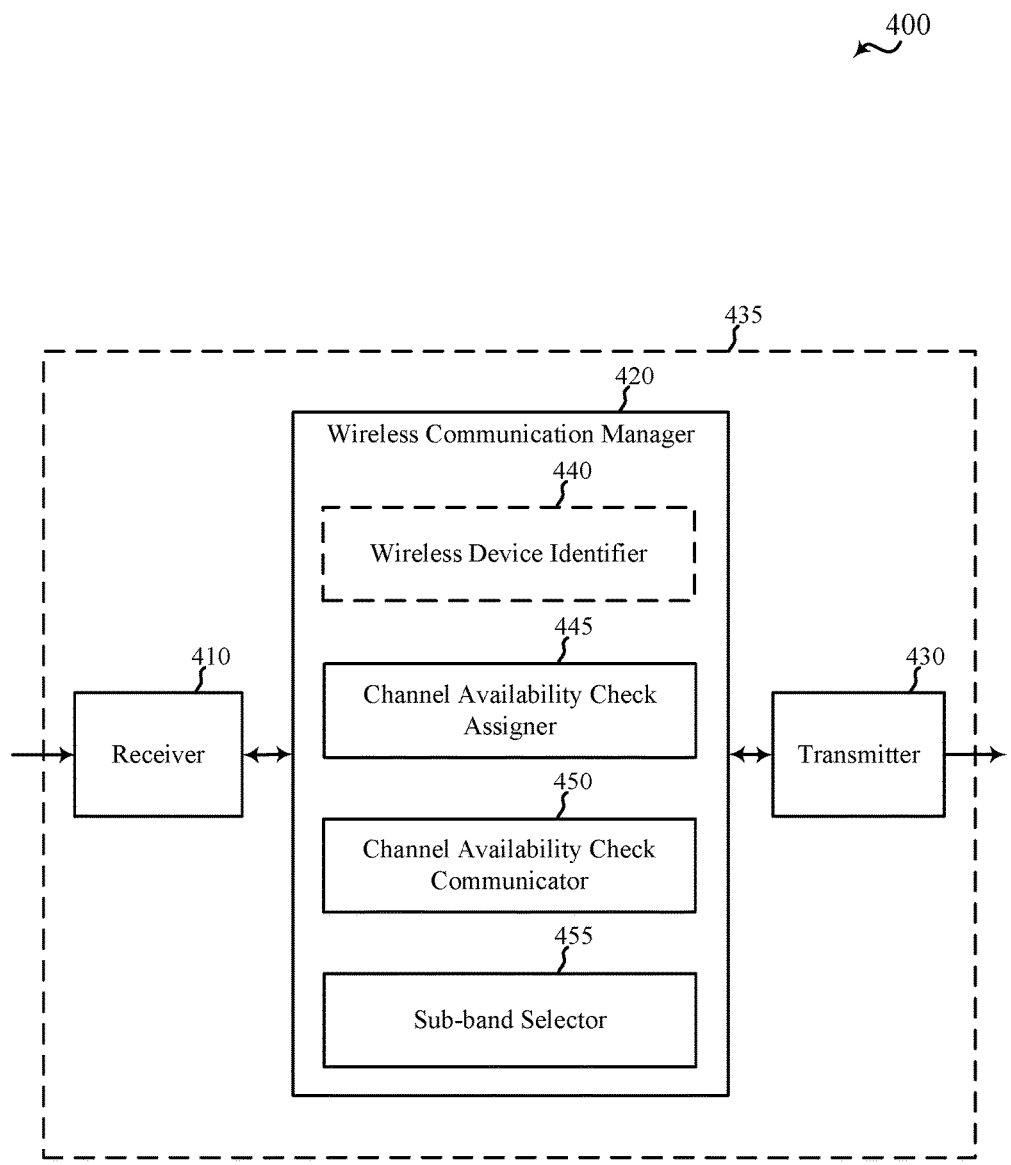
FIG. 4 shows a block diagram of an apparatus for use in wireless communication, in accordance with various aspects of the present disclosure.

FIG. 4 shows a block diagram 400 of an apparatus 435 for use in wireless communication, in accordance with various aspects of the present disclosure. The apparatus 435 may be an example of aspects of one or more of the small cells 135, 235, 235-*a*, 335, 335-*a*, 335-*b*, or 335-*c* described with reference to FIG. 1, 2, or 3, aspects of one or more of the base stations 105 described with reference to FIG. 1, aspects of a central node (e.g., aspects of an eNB or a part of the core network 130 described with reference to FIG. 1), aspects of the management node 305 described with reference to FIG. 3, or aspects of one or more of the UEs 115, 215, 215-*a*, or 215-*b* described with reference to FIG. 1 or 2. The apparatus 435 may, additionally or alternatively, be or include a processor. The apparatus 435 may include a receiver 410, a wireless communication manager 420, or a transmitter 430. Each of these components may be in communication with each other.

The components of the apparatus 435 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may, additionally or alternatively, be implemented, in whole or in part, with instructions embodied in a memory, formatted to be executed by one or more general or application-specific processors.

In some examples, the receiver 410 may include at least one radio frequency (RF) receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by different MNOs in an equally shared or prioritized manner). In some examples, the dedicated radio frequency spectrum band or the shared radio frequency spectrum band may be used for LTE/LTE-A communications, as described, for example, with reference to FIG. 1, 2, or 3. The receiver 410 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 430 may include at least one RF transmitter, such as at least one RF transmitter operable to transmit over the dedicated radio frequency spectrum band or the shared radio frequency spectrum band. The transmitter 430 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 420 may be used to manage one or more aspects of wireless communication for the apparatus 435. In some examples, part of the wireless communication manager 420 may be incorporated into or shared with the receiver 410 or the transmitter 430. In some examples, the wireless communication manager 420 may include a wireless device identifier 440, a channel availability check assigner 445, a channel availability check communicator 450, or a sub-band selector 455.

The wireless device identifier 440 may be used to optionally identify a plurality of wireless devices within a geographic area. In some examples, the plurality of wireless devices may be identified based at least in part on location-based metrics for the plurality of wireless devices. The channel availability check assigner 445 may be used to assign a first portion of a distributed CAC to a first wireless device of the plurality of wireless devices identified by the wireless device identifier 440. In some examples, the distributed CAC may be associated with a sub-band of the shared radio frequency spectrum band. In some examples, the first portion of the distributed CAC may be assigned to the first wireless device based at least in part on a utilization characteristic of the first wireless device. The channel availability check communicator 450 may be used to communicate the assignment of the first portion of the distributed CAC to the first wireless device. In some examples, the assignment of the first portion of the distributed CAC may be communicated to the first wireless device over the dedicated radio frequency spectrum band. The sub-band selector 455 may be used to communicate over the sub-band based at least in part on determining the sub-band is available during remaining portions of the distributed CAC and receiving an indication the sub-band is determined available during the first portion of the distributed CAC. In some examples, the first portion of the distributed CAC and the remaining portions of the distributed CAC may be associated with one of: a same duration, or at least two different durations.

Figure 5:
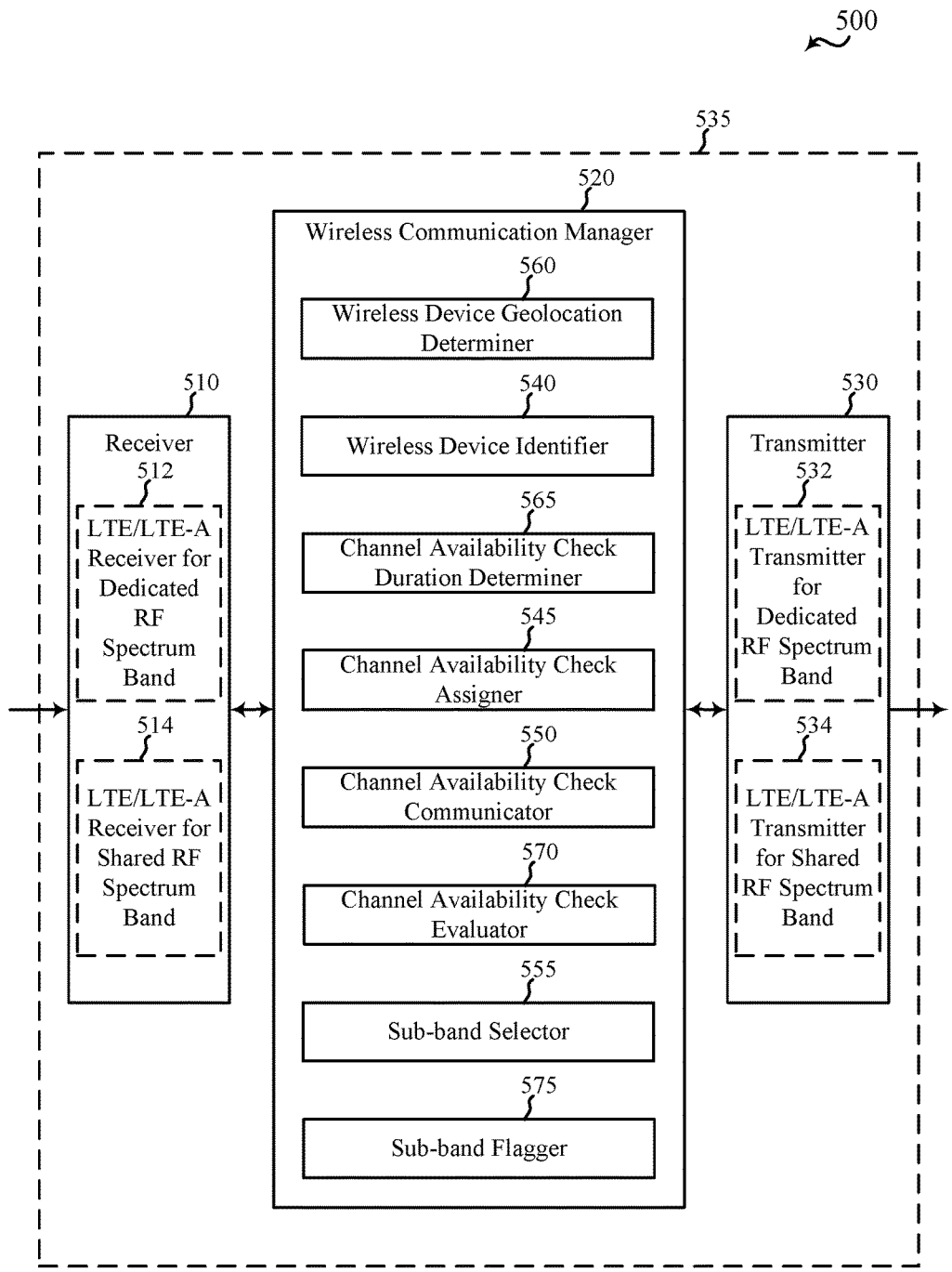
FIG. 5 shows a block diagram of an apparatus for use in wireless communication, in accordance with various aspects of the present disclosure.

FIG. 5 shows a block diagram 500 of an apparatus 535 for use in wireless communication, in accordance with various aspects of the present disclosure. The apparatus 535 may be an example of aspects of one or more of the small cells 135, 235, 235-a, 335, 335-a, 335-b, or 335-c described with reference to FIG. 1, 2, or 3, aspects of one or more of the base stations 105 described with reference to FIG. 1, aspects of a central node (e.g., aspects of an eNB or a part of the core network 130 described with reference to FIG. 1), aspects of the management node 305 described with reference to FIG. 3, aspects of one or more of the UEs 115, 215, 215-a, or 215-b described with reference to FIG. 1 or 2, or aspects of the apparatus 435 described with reference to FIG. 4. The apparatus 535 may, additionally or alternatively, be or include a processor. The apparatus 535 may include a receiver 510, a wireless communication manager 520, or a transmitter 530. Each of these components may be in communication with each other.

The components of the apparatus 535 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may, additionally or alternatively, be implemented, in whole or in part, with instructions embodied in a memory, formatted to be executed by one or more general or application-specific processors.

In some examples, the receiver 510 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by different MNOs in an equally shared or prioritized manner). In some examples, the dedicated radio frequency spectrum band or the shared radio frequency spectrum band may be used for LTE/LTE-A communications, as described, for example, with reference to FIG. 1, 2, or 3. The receiver 510 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 512), and an LTE/LTE-A receiver for communicating over the shared radio frequency spectrum band (e.g., LTE/LTE-A receiver for shared RF spectrum band 514). The receiver 510, including the LTE/LTE-A receiver for dedicated RF spectrum band 512 or the LTE/LTE-A receiver for shared RF spectrum band 514, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 530 may include at least one RF transmitter, such as at least one RF transmitter operable to transmit over the dedicated radio frequency spectrum band or the shared radio frequency spectrum band. The transmitter 530 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 532), and an LTE/LTE-A transmitter for communicating over the shared radio frequency spectrum band (e.g., LTE/LTE-A transmitter for shared RF spectrum band 534). The transmitter 530, including the LTE/LTE-A transmitter for dedicated RF spectrum band 532 or the LTE/LTE-A transmitter for shared RF spectrum band 534, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 520 may be used to manage one or more aspects of wireless communication for the apparatus 535. In some examples, part of the wireless communication manager 520 may be incorporated into or shared with the receiver 510 or the transmitter 530. In some examples, the wireless communication manager 520 may include a wireless device geolocation determiner 560, a wireless device identifier 540, a channel availability check assigner 545, a channel availability check duration determiner 565, a channel availability check communicator 550, a channel availability check evaluator 570, a sub-band selector 555, or a sub-band flagger 575.

The wireless device geolocation determiner 560 may be used to identify location-based metrics for wireless devices, and to determine locations (e.g., geolocations) of the wireless devices.

The wireless device identifier 540 may be used to identify a plurality of wireless devices within a geographic area. In some examples, the plurality of wireless devices may be identified based at least in part on the locations of wireless devices determined by the wireless device geolocation determiner 560.

The channel availability check assigner 545 may be used to assign a first portion of a distributed CAC to a first wireless device of the plurality of wireless devices identified by the wireless device identifier 540. In some examples, the distributed CAC may be associated with a sub-band of the shared radio frequency spectrum band. In some examples, the first portion of the distributed CAC may be assigned to the first wireless device based at least in part on a utilization characteristic of the first wireless device. The channel availability check assigner 545 may also be used to assign other portions of the distributed CAC to other wireless devices. For example, the channel availability check assigner 545 may be used to assign a second portion of the distributed CAC to a second wireless device of the plurality of wireless devices. In some examples, the second portion of the distributed CAC may overlap the first portion of the distributed CAC in time. In some examples, the second portion of the distributed CAC may be contiguous with the first portion of the distributed CAC in time. Overlapping portions may, for example, provide greater leeway in communicating assigned portions of the distributed CAC to wireless devices. Contiguous portions may, for example, decrease the time that a wireless device needs to cease wireless communication to monitor an energy level of a sub-band during an assigned portion of the distributed CAC. In some examples, the second portion of the distributed CAC may be assigned to the second wireless device based at least in part on a utilization characteristic of the second wireless device. In some examples, the first wireless device, the second wireless device, or another wireless device to which a portion of the distributed CAC is assigned may be a wireless including the apparatus 535.

The channel availability check duration determiner 565 may be used to determine durations of the portions of the distributed CAC (e.g., a duration of the first portion of the distributed CAC or the second portion of the distributed CAC) based at least in part on: a first number of wireless devices in the plurality of wireless devices, or a second number of wireless devices in the plurality of wireless devices capable of performing a portion of the distributed CAC, or a maximum number of wireless devices for performing the distributed CAC. In some examples, the portions of the distributed CAC may be associated with one of: a same duration, or at least two different durations. Dividing a CAC into more portions of smaller duration may decrease the amount of time that a wireless device may need to cease wireless communication and monitor an energy level of the sub-band for an assigned portion of the distributed CAC. Dividing a CAC into fewer portions of longer duration may decrease the management overhead for the distributed CAC, and may also decrease the amount of time that a wireless device may need to cease wireless communication and monitor an energy level of the sub-band for an assigned portion of the distributed CAC. Dividing a CAC into portions of different duration may enable the apparatus 535 to allocate a greater portion of the CAC to a wireless device with lower utilization than another wireless device.

The channel availability check communicator 550 may be used to communicate assignments of the portions of the distributed CAC to wireless devices. For example, the channel availability check communicator 550 may be used to communicate the assignment of the first portion of the distributed CAC to the first wireless device, and to communicate the assignment of the second portion of the distributed CAC to the second wireless device. In some examples, the channel availability check communicator 550 may be used to communicate the assignment of the second portion of the distributed CAC to the second wireless device after communicating the assignment of the first portion of the distributed CAC to the first wireless device. Communicating some portions later than others may enable the apparatus 535 to assign portions of the distributed CAC more dynamically, based on current wireless device utilizations, the success of prior portions of the distributed CAC, etc. In some examples, assignments of portions of the distributed CAC may be communicated to wireless devices over the dedicated radio frequency spectrum band.

The channel availability check evaluator 570 may be used to determine whether an indication the sub-band is unavailable is received for a portion of the distributed CAC. In some examples, receipt of an indication the sub-band is unavailable during the first portion of the distributed CAC, may cause the channel availability check assigner 545 to not assign the second portion of the distributed CAC to the second wireless device or cause the channel availability check communicator 550 to not communicate the assignment of the second portion of the distributed CAC to the second wireless device. The channel availability check evaluator 570 may also be used to determine whether the sub-band is available during all portions of the distributed CAC. In some examples, the determination may be based on at least one indication the sub-band is available (e.g., a first indication the sub-band is available during the first portion of the distributed CAC, received from the first wireless device, or a second indication the sub-band is available during the second portion of the distributed CAC, received from the second wireless device, etc.).

The sub-band selector 555 may be used to communicate over the sub-band based at least in part on the channel availability check evaluator 570 determining the sub-band is available during all portions of the distributed CAC.

The sub-band flagger 575 may be used to flag the sub-band is unavailable for a period of time based at least in part on the channel availability check evaluator 570 determining an indication the sub-band is unavailable is received during the distributed CAC.

Figure 6:
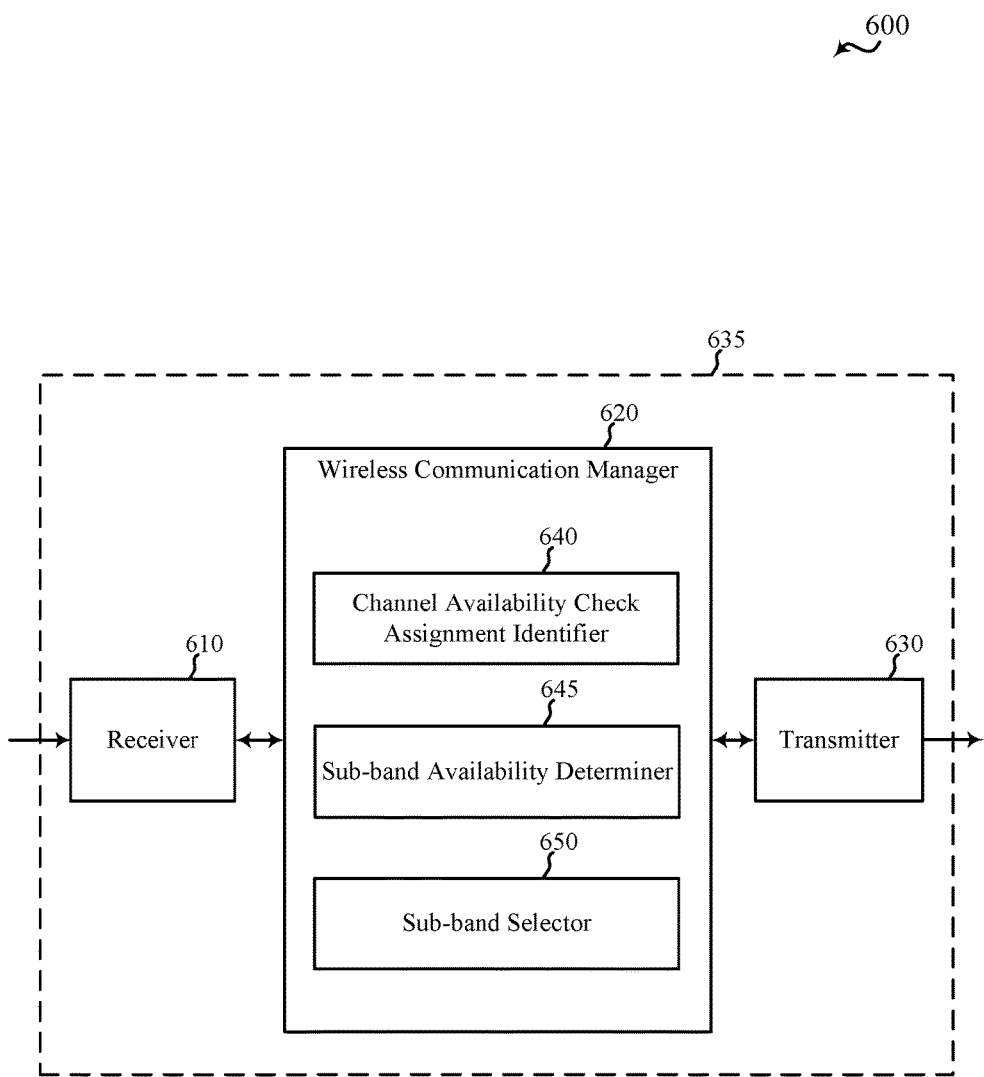
FIG. 6 shows a block diagram of an apparatus for use in wireless communication, in accordance with various aspects of the present disclosure.

FIG. 6 shows a block diagram 600 of an apparatus 635 for use in wireless communication, in accordance with various aspects of the present disclosure. The apparatus 635 may be an example of aspects of one or more of the small cells 135, 235, 235-a, 335, 335-a, 335-b, or 335-c described with reference to FIG. 1, 2, or 3, aspects of one or more of the base stations 105 described with reference to FIG. 1, or aspects of one or more of the UEs 115, 215, 215-a, or 215-b described with reference to FIG. 1 or 2. The apparatus 635 may, additionally or alternatively, be or include a processor. The apparatus 635 may include a receiver 610, a wireless communication manager 620, or a transmitter 630. Each of these components may be in communication with each other.

The components of the apparatus 635 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may, additionally or alternatively, be implemented, in whole or in part, with instructions embodied in a memory, formatted to be executed by one or more general or application-specific processors.

In some examples, the receiver 610 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by different MNOs in an equally shared or prioritized manner). In some examples, the dedicated radio frequency spectrum band or the shared radio frequency spectrum band may be used for LTE/LTE-A communications, as described, for example, with reference to FIG. 1, 2, or 3. The receiver 610 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 630 may include at least one RF transmitter, such as at least one RF transmitter operable to transmit over the dedicated radio frequency spectrum band or the shared radio frequency spectrum band. The transmitter 630 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 620 may be used to manage one or more aspects of wireless communication for the apparatus 635. In some examples, part of the wireless communication manager 620 may be incorporated into or shared with the receiver 610 or the transmitter 630. In some examples, the wireless communication manager 620 may include a channel availability check assignment identifier 640, a sub-band availability determiner 645, or a sub-band selector 650.

The channel availability check assignment identifier 640 may be used to optionally receive an assignment of a first portion of a distributed CAC from a wireless communication device other than a wireless communication device including the apparatus 635. In some examples, the assignment of the first portion of the distributed CAC may be received over the dedicated radio frequency spectrum band. The first portion of the distributed CAC may or may not be a temporally first portion of the distributed CAC. The sub-band availability determiner 645 may be used to determine an availability of a sub-band of the shared radio frequency spectrum band during the first portion of the distributed CAC. The sub-band availability determiner 645 may also be used to determine whether at least one indication that the sub-band is available during remaining portions of the distributed CAC is received. In some examples, an indication the sub-band is determined available during at least a second portion of the distributed CAC may be received by the sub-band availability determiner 645. In some examples, the indication the sub-band is determined available during at least the second portion of the distributed CAC may be received from a network access device (e.g., a base station or small cell). The sub-band selector 650 may be used to communicate over the sub-band based at least in part on determining the sub-band is available during the first portion of the distributed CAC and the at least one indication that the sub-band is available during remaining portions of the distributed CAC.

Figure 7:
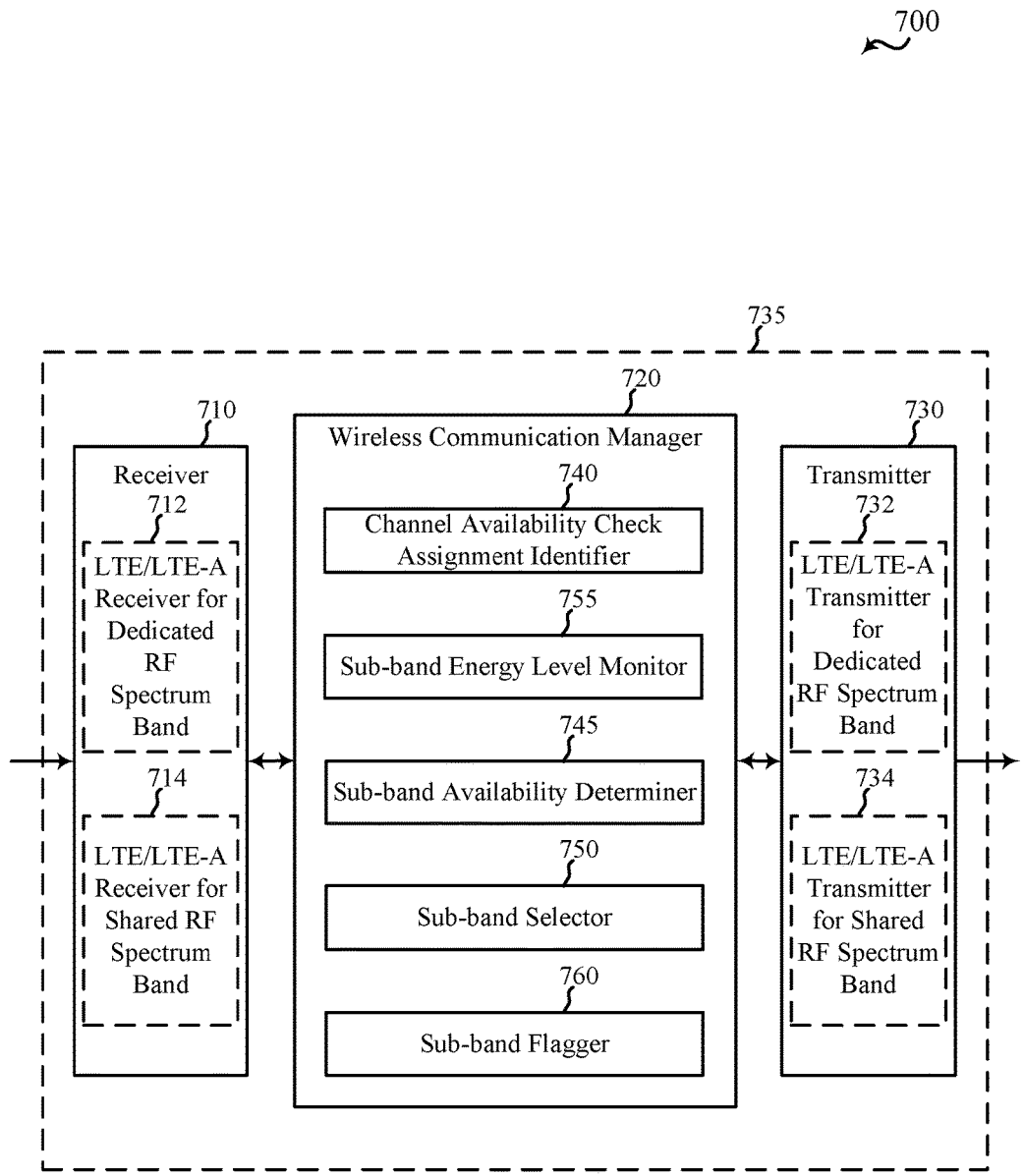
FIG. 7 shows a block diagram of an apparatus for use in wireless communication, in accordance with various aspects of the present disclosure.

FIG. 7 shows a block diagram 700 of an apparatus 735 for use in wireless communication, in accordance with various aspects of the present disclosure. The apparatus 735 may be an example of aspects of one or more of the small cells 135, 235, 235-a, 335, 335-a, 335-b, or 335-c described with reference to FIG. 1, 2, or 3, aspects of one or more of the base stations 105 described with reference to FIG. 1, aspects of one or more of the UEs 115, 215, 215-a, or 215-b described with reference to FIG. 1 or 2, or aspects of the apparatus 635 described with reference to FIG. 6. The apparatus 735 may, additionally or alternatively, be or include a processor. The apparatus 735 may include a receiver 710, a wireless communication manager 720, or a transmitter 730. Each of these components may be in communication with each other.

The components of the apparatus 735 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may, additionally or alternatively, be implemented, in whole or in part, with instructions embodied in a memory, formatted to be executed by one or more general or application-specific processors.

In some examples, the receiver 710 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by different MNOs in an equally shared or prioritized manner). In some examples, the dedicated radio frequency spectrum band or the shared radio frequency spectrum band may be used for LTE/LTE-A communications, as described, for example, with reference to FIG. 1, 2, or 3. The receiver 710 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 712), and an LTE/LTE-A receiver for communicating over the shared radio frequency spectrum band (e.g., LTE/LTE-A receiver for shared RF spectrum band 714). The receiver 710, including the LTE/LTE-A receiver for dedicated RF spectrum band 712 or the LTE/LTE-A receiver for shared RF spectrum band 714, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 730 may include at least one RF transmitter, such as at least one RF transmitter operable to transmit over the dedicated radio frequency spectrum band or the shared radio frequency spectrum band. The transmitter 730 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 732), and an LTE/LTE-A transmitter for communicating over the shared radio frequency spectrum band (e.g., LTE/LTE-A transmitter for shared RF spectrum band 734). The transmitter 730, including the LTE/LTE-A transmitter for dedicated RF spectrum band 732 or the LTE/LTE-A transmitter for shared RF spectrum band 734, may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 720 may be used to manage one or more aspects of wireless communication for the apparatus 735. In some examples, part of the wireless communication manager 720 may be incorporated into or shared with the receiver 710 or the transmitter 730. In some examples, the wireless communication manager 720 may include a channel availability check assignment identifier 740, a sub-band energy level monitor 755, a sub-band availability determiner 745, a sub-band selector 750, or a sub-band flagger 760.

The channel availability check assignment identifier 740 may be used to optionally receive an assignment of a first portion of a distributed CAC from a wireless communication device other than a wireless communication device including the apparatus 735. In some examples, the assignment of the first portion of the distributed CAC may be received over the dedicated radio frequency spectrum band. The first portion of the distributed CAC may or may not be a temporally first portion of the distributed CAC.

The sub-band energy level monitor 755 may be used to monitor an energy level of a sub-band of the shared radio frequency spectrum band for a period of time corresponding to the first portion of the distributed CAC. The period of time for which the energy level of the sub-band is monitored may be less than a duration of the distributed CAC, thereby decreasing the time that the apparatus 735 may need to cease wireless communication to perform the monitoring. The sub-band energy level monitor 755 may discontinue monitoring the energy level of the sub-band based at least in part on determining the sub-band is unavailable (e.g., by detecting energy on the sub-band, by detecting energy on the sub-band exceeding a threshold energy, or by detecting energy on the sub-band for greater than a threshold time period). Discontinuing the monitoring before the end of the first portion of the distributed CAC may enable early termination of the distributed CAC, and in some examples may enable other apparatuses to forego performance of portions of the distributed CAC that no longer matter (e.g., another portion of the distributed CAC may not matter if the distributed CAC will fail regardless of whether the other portion is successfully performed). The sub-band energy level monitor 755 may also discontinue monitoring the energy level of the sub-band upon successfully completing the first portion of the distributed CAC.

The sub-band availability determiner 745 may be used to determine an availability of a sub-band of the shared radio frequency spectrum band during the first portion of the distributed CAC. The sub-band availability determiner 745 may also be used to determine whether at least one indication that the sub-band is available during remaining portions of the distributed CAC is received. By receiving one or more indications that the sub-band is determined available during remaining portions of the distributed CAC, the apparatus 735 may not need to cease wireless communication to monitor an energy level of the sub-band during the remaining portions. In some examples, an indication the sub-band is determined available during at least a second portion of the distributed CAC may be received by the sub-band availability determiner 745. In some examples, the indication the sub-band is determined available during at least the second portion of the distributed CAC may be received from a network access device (e.g., a base station or small cell). When a distributed CAC is managed by a network access device (or other network device), the network access device (or other network device) may transmit indications of sub-band availability to any or all of the wireless devices within the geographic area for which the distributed CAC is performed.

The sub-band selector 750 may be used to communicate over the sub-band based at least in part on determining the sub-band is available during the first portion of the distributed CAC and the at least one indication that the sub-band is available during remaining portions of the distributed CAC.

The sub-band flagger 760 may be used to flag the sub-band unavailable for a period of time. The sub-band may be flagged unavailable when, for example, the sub-band availability determiner 745 determines the sub-band is unavailable.

Figure 8:
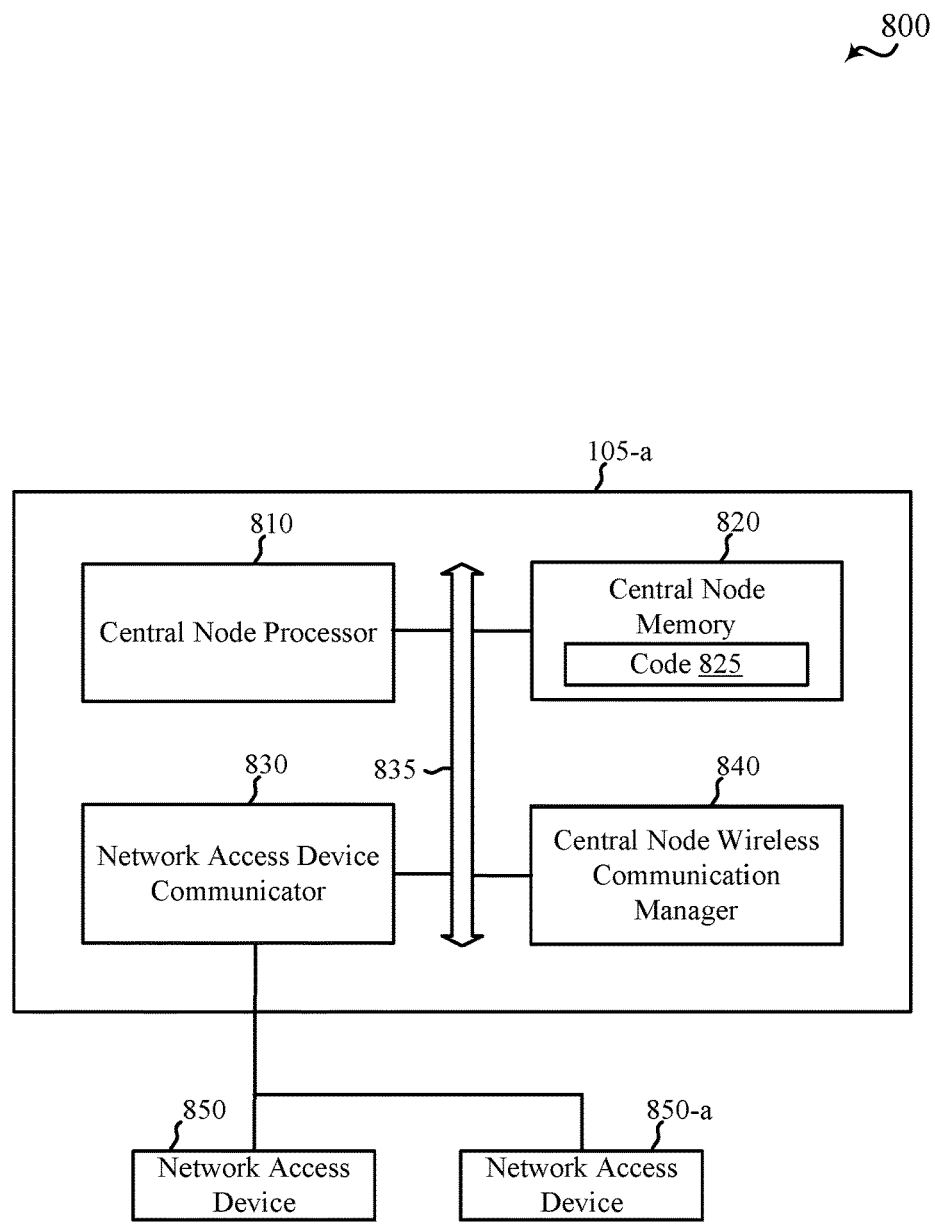
FIG. 8 shows a block diagram of a central node, in accordance with various aspects of the present disclosure.

FIG. 8 shows a block diagram 800 of a central node 805, in accordance with various aspects of the present disclosure. In some examples, the central node 805 may be an example of aspects of one or more of the eNBs or core network 130 described with reference to FIG. 1. The central node 805 may be configured to implement at least some of the distributed CAC management functions described with reference to FIG. 3, 4, 5, 6, or 7.

The central node 805 may include a central node processor 810, a central node memory 820, a network access device communicator 830, or a central node wireless communication manager 840. Each of these components may be in communication with each other, directly or indirectly, over one or more buses 835.

The central node memory 820 may include random access memory (RAM) or read-only memory (ROM). The central node memory 820 may store computer-readable, computer-executable code 825 containing instructions that are configured to, when executed, cause the central node processor 810 to perform various functions described herein related to wireless communication, including, for example, assigning a first portion of a distributed CAC to a first wireless device of a plurality of wireless devices, where the distributed CAC is associated with a sub-band of a shared radio frequency spectrum band; communicating the assignment of the first portion of the distributed CAC to the first wireless device; and communicating over the sub-band based at least in part on receiving an indication the sub-band is determined available during the first portion of the distributed CAC and determining the sub-band is available during remaining portions of the distributed CAC. Alternatively, the computer-executable code 825 may not be directly executable by the central node processor 810 but be configured to cause the central node 805 (e.g., when compiled and executed) to perform various of the functions described herein.

The central node processor 810 may include an intelligent hardware device, e.g., a central processing unit (CPU), a microcontroller, an ASIC, etc. The central node processor 810 may process information received through the network access device communicator 830 or information to be sent to one or more network access devices (e.g., base stations or small cells) via the network access device communicator 830. The central node processor 810 may handle, alone or in connection with the central node wireless communication manager 840, various aspects of communicating over (or managing communications over) a wireless medium (e.g., a dedicated radio frequency spectrum band or a shared radio frequency spectrum band).

The network access device communicator 830 may be used by the central node 805 to communicate with one or more network access devices 850 and 850-a. The network access device communicator 830 may be configured to communicate bi-directionally with the one or more of the network access devices 850 and 850-*a*. In some examples, the network access devices 850 and 850-*a* may be examples of aspects of one or more of the base stations 105 described with reference to FIG. 1 or small cells 135, 235, 235-*a*, 335, 335-*a*, 335-*b*, or 335-*c* described with reference to FIG. 1, 2, or 3.

The central node wireless communication manager 840 may be configured to perform or control some or all of the distributed CAC management functions described with reference to FIG. 2, 3, 4, 5, 6, or 7. The central node wireless communication manager 840, or portions of it, may include a processor, or some or all of the functions of the central node wireless communication manager 840 may be performed by the central node processor 810 or in connection with the central node processor 810. In some examples, the central node wireless communication manager 840 may be an example of the wireless communication manager 420 or 520 described with reference to FIG. 4 or 5.

Figure 9:
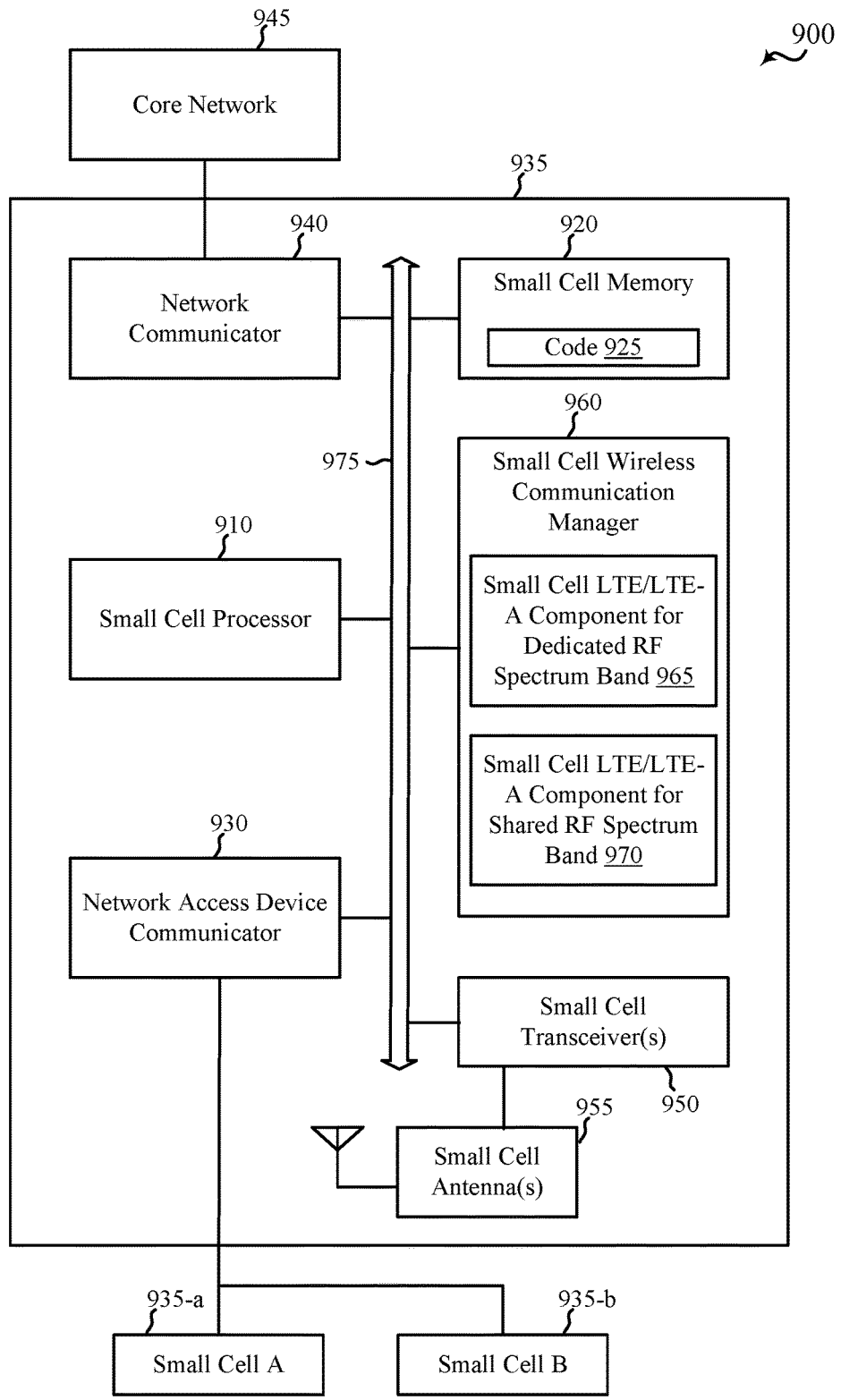
FIG. 9 shows a block diagram of a small cell for use in wireless communication, in accordance with various aspects of the present disclosure.

FIG. 9 shows a block diagram 900 of a small cell 935 for use in wireless communication, in accordance with various aspects of the present disclosure. In some examples, the small cell 935 may be an example of one or more aspects of the small cells 135, 235, 235-*a*, 335, 335-*a*, 335-*b*, or 335-*c* described with reference to FIG. 1, 2, or 3, aspects of one or more of the base stations 105 described with reference to FIG. 1, or aspects of one or more of the apparatuses 435, 535, 635, or 735 described with reference to FIG. 4, 5, 6, or 7. The small cell 935 may be configured to implement or facilitate at least some of the small cell or base station techniques and functions described with reference to FIG. 1, 2, 3, 4, 5, 6, or 7.

The small cell 935 may include a small cell processor 910, a small cell memory 920, at least one small cell transceiver (represented by small cell transceiver(s) 950), at least one small cell antenna (represented by small cell antenna(s) 955), or a small cell wireless communication manager 960. The small cell 935 may, additionally or alternatively, include one or more of a network access device communicator 930 or a network communicator 940. Each of these components may be in communication with each other, directly or indirectly, over one or more buses 975.

The small cell memory 920 may include RAM or ROM. The small cell memory 920 may store computer-readable, computer-executable code 925 containing instructions that are configured to, when executed, cause the small cell processor 910 to perform various functions described herein related to wireless communication, including, for example, assigning a first portion of a distributed CAC to a first wireless device of a plurality of wireless devices, where the distributed CAC is associated with a sub-band of a shared radio frequency spectrum band; communicating the assignment of the first portion of the distributed CAC to the first wireless device; and communicating over the sub-band based at least in part on receiving an indication the sub-band is determined available during the first portion of the distributed CAC and determining the sub-band is available during remaining portions of the distributed CAC. Alternatively, the computer-executable code 925 may not be directly executable by the small cell processor 910 but be configured to cause the small cell 935 (e.g., when compiled and executed) to perform various of the functions described herein. In some examples, the code 925 may also or alternatively contain instructions that are configured to, when executed, cause the small cell processor 910 to determine an availability of a sub-band of a shared radio frequency spectrum band during a first portion of a distributed CAC; receive at least one indication that the sub-band is available during remaining portions of the distributed CAC; and communicate over the sub-band based at least in part on determining the sub-band is available during the first portion of the distributed CAC and the at least one indication that the sub-band is available during remaining portions of the distributed CAC.

The small cell processor 910 may include an intelligent hardware device, e.g., a CPU, a microcontroller, an ASIC, etc. The small cell processor 910 may process information received through the small cell transceiver(s) 950, the network access device communicator 930, or the network communicator 940. The small cell processor 910 may, additionally or alternatively, process information to be sent to the transceiver(s) 950 for transmission through the antenna(s) 955, to the network access device communicator 930, for transmission to one or more other network access devices (e.g., a small cell 935-*a* and/or small cell 935-*b*), or to the network communicator 940 for transmission to a core network 945, which may be an example of one or more aspects of the core network 130 described with reference to FIG. 1. The small cell processor 910 may handle, alone or in connection with the small cell wireless communication manager 960, various aspects of communicating over a wireless medium (e.g., a dedicated radio frequency spectrum band or a shared radio frequency spectrum band).

The small cell transceiver(s) 950 may include a modem configured to modulate packets and provide the modulated packets to the small cell antenna(s) 955 for transmission, and to demodulate packets received from the small cell antenna(s) 955. The small cell transceiver(s) 950 may, in some examples, be implemented as one or more small cell transmitters and one or more separate small cell receivers. The small cell transceiver(s) 950 may support communications in a dedicated radio frequency spectrum band or the shared radio frequency spectrum band. The small cell transceiver(s) 950 may be configured to communicate bi-directionally, via the small cell antenna(s) 955, with one or more UEs or apparatuses, such as one or more of the UEs 115, 215, 215-*a*, or 215-*b* described with reference to FIG. 1 or 2, or one or more of the apparatuses 435, 535, 635, or 735 described with reference to FIG. 4, 5, 6, or 7. The small cell 935 may, for example, include multiple small cell antennas 955 (e.g., an antenna array). The small cell 935 may communicate with the core network 945 through the network communicator 940. The small cell 935 may, additionally or alternatively, communicate with other network access devices (e.g., other small cells or base stations), such as the small cell 935-*a* and/or the small cell 935-*b*, using the network access device communicator 930.

The small cell wireless communication manager 960 may be configured to perform or control some or all of the techniques or functions described with reference to FIG. 1, 2, 3, 4, 5, 6, or 7, related to wireless communication over the dedicated radio frequency spectrum band or the shared radio frequency spectrum band. For example, the small cell wireless communication manager 960 may be configured to support a supplemental downlink mode (e.g., a licensed assisted access mode), a carrier aggregation mode, or a standalone mode using the dedicated radio frequency spectrum band or the shared radio frequency spectrum band. The small cell wireless communication manager 960 may include a small cell LTE/LTE-A component for dedicated RF spectrum band 965 configured to handle LTE/LTE-A communications in the dedicated radio frequency spectrum band, and a small cell LTE/LTE-A component for shared RF spectrum band 970 configured to handle LTE/LTE-A communications in the shared radio frequency spectrum band.

The small cell wireless communication manager 960, or portions of it, may include a processor, or some or all of the functions of the small cell wireless communication manager 960 may be performed by the small cell processor 910 or in connection with the small cell processor 910. In some examples, the small cell wireless communication manager 960 may be an example of the wireless communication manager 420, 520, 620, or 720 described with reference to FIG. 4, 5, 6, or 7.

Figure 10:
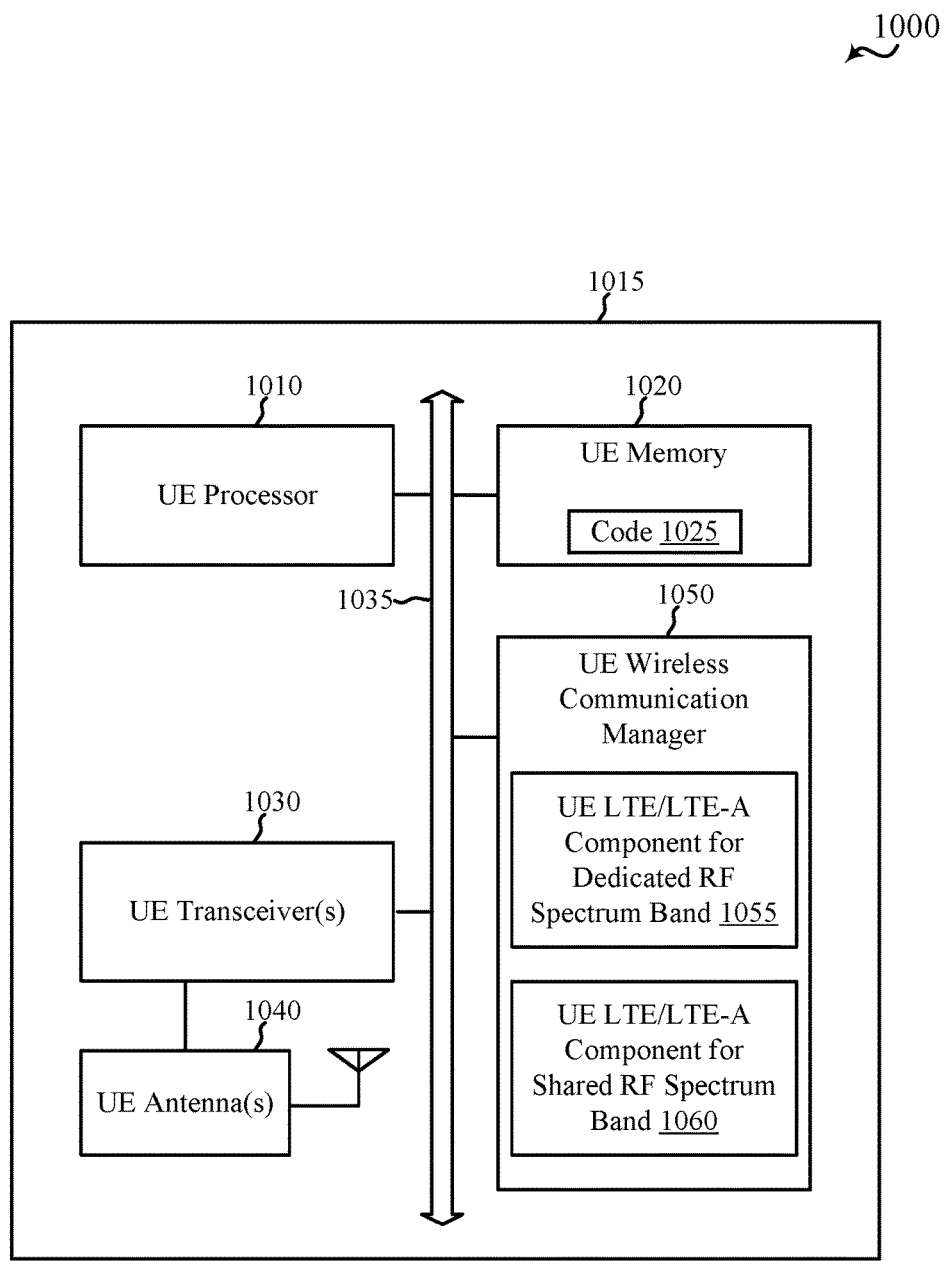
FIG. 10 shows a block diagram of a UE for use in wireless communication, in accordance with various aspects of the present disclosure.

FIG. 10 shows a block diagram 1000 of a UE 1015 for use in wireless communication, in accordance with various aspects of the present disclosure. The UE 1015 may be included or be part of a personal computer (e.g., a laptop computer, a netbook computer, a tablet computer, etc.), a cellular telephone, a PDA, a DVR, an internet appliance, a gaming console, an e-reader, etc. The UE 1015 may, in some examples, have an internal power supply (not shown), such as a small battery, to facilitate mobile operation. In some examples, the UE 1015 may be an example of aspects of one or more of the UEs 115, 215, 215-*a*, or 215-*b* described with reference to FIG. 1 or 2, or aspects of one or more of the apparatuses 435, 535, 635, or 735 described with reference to FIG. 4, 5, 6, or 7. The UE 1015 may be configured to implement at least some of the UE or apparatus techniques and functions described with reference to FIG. 1, 2, 3, 4, 5, 6, or 7.

The UE 1015 may include a UE processor 1010, a UE memory 1020, at least one UE transceiver (represented by UE transceiver(s) 1030), at least one UE antenna (represented by UE antenna(s) 1040), or a UE wireless communication manager 1050. Each of these components may be in communication with each other, directly or indirectly, over one or more buses 1035.

The UE memory 1020 may include RAM or ROM. The UE memory 1020 may store computer-readable, computer-executable code 1025 containing instructions that are configured to, when executed, cause the UE processor 1010 to perform various functions described herein related to wireless communication, including, for example, determining an availability of a sub-band of a shared radio frequency spectrum band during a first portion of a distributed CAC; receiving at least one indication that the sub-band is available during remaining portions of the distributed CAC; and communicating over the sub-band based at least in part on determining the sub-band is available during the first portion of the distributed CAC and the at least one indication that the sub-band is available during remaining portions of the distributed CAC. Alternatively, the computer-executable code 1025 may not be directly executable by the UE processor 1010 but be configured to cause the UE 1015 (e.g., when compiled and executed) to perform various of the functions described herein. In some examples, the code 925 may also or alternatively contain instructions that are configured to, when executed, cause the small cell processor 910 to assign a first portion of a distributed CAC to a first wireless device of a plurality of wireless devices, where the distributed CAC is associated with a sub-band of a shared radio frequency spectrum band; communicate the assignment of the first portion of the distributed CAC to the first wireless device; and communicate over the sub-band based at least in part on receiving an indication the sub-band is determined available during the first portion of the distributed CAC and determining the sub-band is available during remaining portions of the distributed CAC.

The UE processor 1010 may include an intelligent hardware device, e.g., a CPU, a microcontroller, an ASIC, etc. The UE processor 1010 may process information received through the UE transceiver(s) 1030 or information to be sent to the UE transceiver(s) 1030 for transmission through the UE antenna(s) 1040. The UE processor 1010 may handle, alone or in connection with the UE wireless communication manager 1050, various aspects of communicating over a wireless medium (e.g., a dedicated radio frequency spectrum band or a shared radio frequency spectrum band).

The UE transceiver(s) 1030 may include a modem configured to modulate packets and provide the modulated packets to the UE antenna(s) 1040 for transmission, and to demodulate packets received from the UE antenna(s) 1040. The UE transceiver(s) 1030 may, in some examples, be implemented as one or more UE transmitters and one or more separate UE receivers. The UE transceiver(s) 1030 may support communications in a dedicated radio frequency spectrum band or a shared radio frequency spectrum band. The UE transceiver(s) 1030 may be configured to communicate bi-directionally, via the UE antenna(s) 1040, with one or more network access devices (e.g., small cells or base stations) or apparatuses, such as one or more of the small cells 135, 235, 235-*a*, 335, 335-*a*, 335-*b*, 335-*c*, or 935 described with reference to FIG. 1, 2, 3, or 9, one or more of the base stations 105 described with reference to FIG. 1, or one or more of the apparatuses 435, 535, 635, or 735 described with reference to FIG. 4, 5, 6, or 7. While the UE 1015 may include a single UE antenna, there may be examples in which the UE 1015 may include multiple UE antennas 1040.

The UE wireless communication manager 1050 may be configured to perform or control some or all of the UE or apparatus techniques or functions described with reference to FIG. 1, 2, 3, 4, 5, 6, or 7 related to wireless communication over the dedicated radio frequency spectrum band or the shared radio frequency spectrum band. For example, the UE wireless communication manager 1050 may be configured to support a supplemental downlink mode (e.g., a licensed assisted access mode), a carrier aggregation mode, or a standalone mode using the licensed spectrum or the unlicensed spectrum. The UE wireless communication manager 1050 may include a UE LTE/LTE-A component for dedicated RF spectrum band 1055 configured to handle LTE/LTE-A communications in the dedicated radio frequency spectrum band, and a UE LTE/LTE-A component for shared RF spectrum band 1060 configured to handle LTE/LTE-A communications in the shared radio frequency spectrum band. The UE wireless communication manager 1050, or portions of it, may include a processor, or some or all of the functions of the UE wireless communication manager 1050 may be performed by the UE processor 1010 or in connection with the UE processor 1010. In some examples, the UE wireless communication manager 1050 may be an example of the wireless communication manager 420, 520, 620, or 720 described with reference to FIG. 4, 5, 6, or 7.

Figure 11:
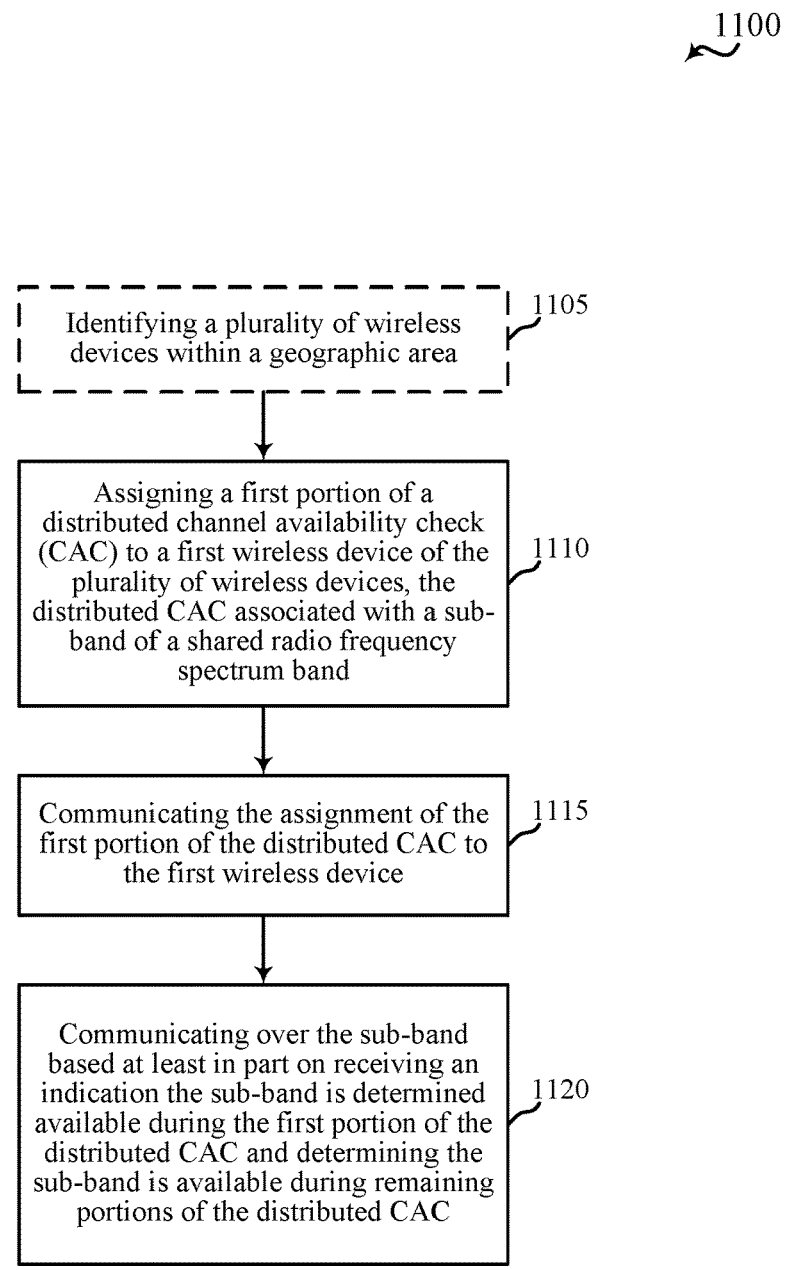
FIG. 11 is a flow chart illustrating an example of a method for wireless communication at a wireless communication device, in accordance with various aspects of the present disclosure.

FIG. 11 is a flow chart illustrating an example of a method 1100 for wireless communication at a wireless communication device, in accordance with various aspects of the present disclosure. For clarity, the method 1100 is described below with reference to a wireless communication device including aspects of one or more of the small cells 135, 235, 235-*a*, 335, 335-*a*, 335-*b*, 335-*c*, or 935 described with reference to FIG. 1, 2, 3, or 9, aspects of one or more of the base stations 105 described with reference to FIG. 1, aspects of the central node 805 described with reference to FIG. 8, aspects of the management node 305 described with reference to FIG. 3, aspects of one or more of the UEs 115, 215, 215-*a*, 215-*b*, or 1015 described with reference to FIG. 1, 2, or 10, or aspects of one or more of the apparatuses 435 or 535 described with reference to FIG. 4 or 5. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1105, the method 1100 may optionally include identifying a plurality of wireless devices within a geographic area. In some examples, the plurality of wireless devices may be identified based at least in part on location-based metrics for the plurality of wireless devices. The operation(s) at block 1105 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the wireless device identifier 440 or 540 described with reference to FIG. 4 or 5.

At block 1110, the method 1100 may include assigning a first portion of a distributed CAC to a first wireless device of the plurality of wireless devices. In some examples, the distributed CAC may be associated with a sub-band of a shared radio frequency spectrum band. In some examples, the method 1100 may include assigning the first portion of the distributed CAC to the first wireless device based at least in part on a utilization characteristic of the first wireless device. The operation(s) at block 1110 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the channel availability check assigner 445 or 545 described with reference to FIG. 4 or 5.

At block 1115, the method 1100 may include communicating the assignment of the first portion of the distributed CAC to the first wireless device. In some examples, the assignment of the first portion of the distributed CAC may be communicated to the first wireless device over a dedicated radio frequency spectrum band. The operation(s) at block 1115 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the channel availability check communicator 450 or 550, described with reference to FIG. 4 or 5.

At block 1120, the method 1100 may include communicating over the sub-band based at least in part on determining the sub-band is available during the first portion of the distributed CAC and the at least one indication that the sub-band is available during remaining portions of the distributed CAC. The operation(s) at block 1120 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the sub-band selector 455 or 555 described with reference to FIG. 4 or 5.

In some examples, the first portion of the distributed CAC and the remaining portions of the distributed CAC may be associated with one of: a same duration, or at least two different durations.

Thus, the method 1100 may provide for wireless communication. It should be noted that the method 1100 is just one implementation and that the operations of the method 1100 may be rearranged or otherwise modified such that other implementations are possible.

Figure 12:
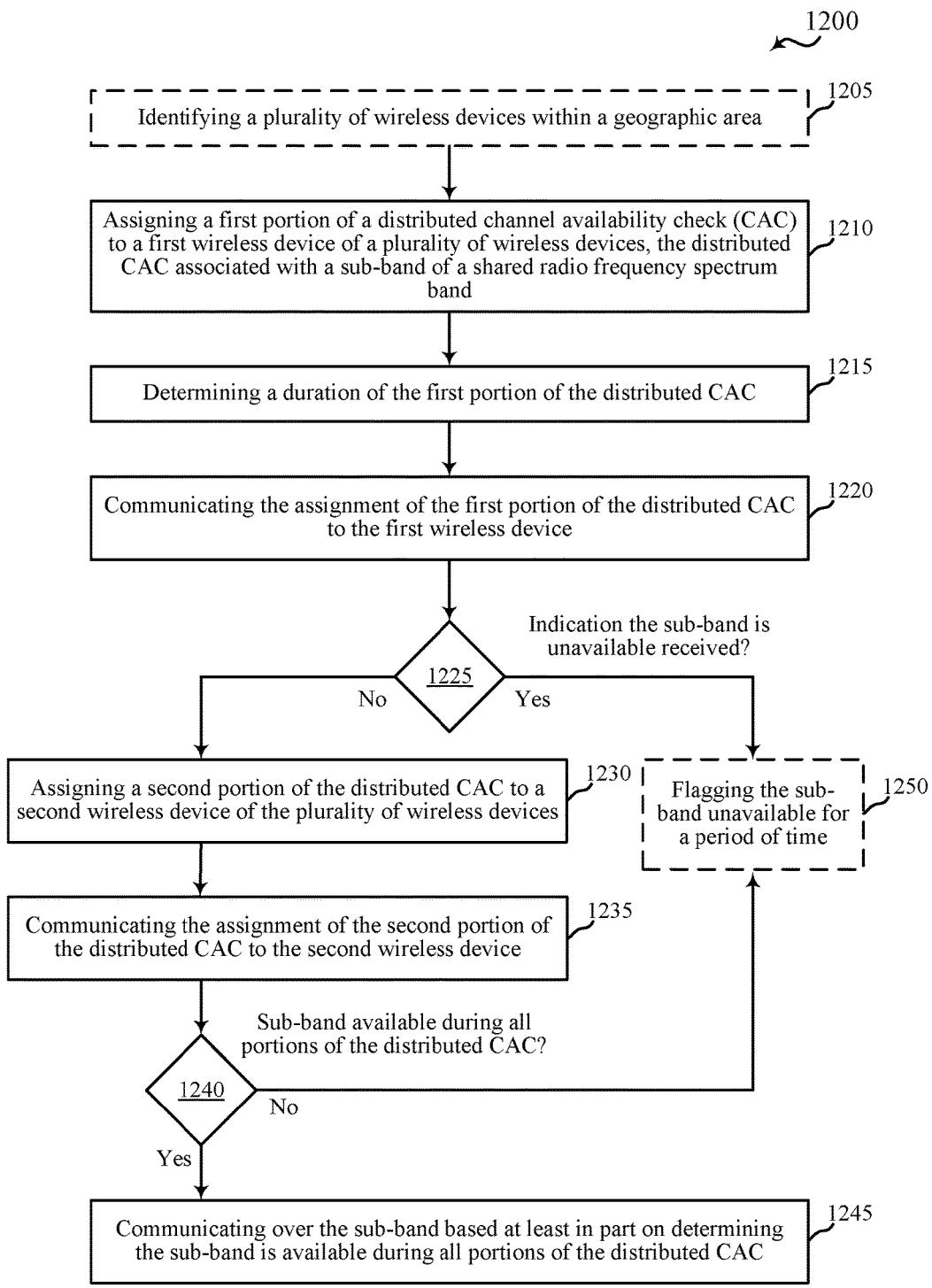
FIG. 12 is a flow chart illustrating an example of a method for wireless communication at a wireless communication device, in accordance with various aspects of the present disclosure.

FIG. 12 is a flow chart illustrating an example of a method 1200 for wireless communication at a wireless communication device, in accordance with various aspects of the present disclosure. For clarity, the method 1200 is described below with reference to a wireless communication device including aspects of one or more of the small cells 135, 235, 235-a, 335, 335-a, 335-b, 335-c, or 935 described with reference to FIG. 1, 2, 3, or 9, aspects of one or more of the base stations 105 described with reference to FIG. 1, aspects of the central node 805 described with reference to FIG. 8, aspects of the management node 305 described with reference to FIG. 3, aspects of one or more of the UEs 115, 215, 215-a, 215-b, or 1015 described with reference to FIG. 1, 2, or 10, or aspects of one or more of the apparatuses 435 or 535 described with reference to FIG. 4 or 5. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1205, the method 1200 may optionally include identifying a plurality of wireless devices within a geographic area. In some examples, the plurality of wireless devices may be identified based at least in part on location-based metrics for the plurality of wireless devices. The operation(s) at block 1205 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the wireless device identifier 440 or 540 described with reference to FIG. 4 or 5.

At block 1210, the method 1200 may include assigning a first portion of a distributed CAC to a first wireless device of the plurality of wireless devices. In some examples, the distributed CAC may be associated with a sub-band of a shared radio frequency spectrum band. In some examples, the method 1200 may include assigning the first portion of the distributed CAC to the first wireless device based at least in part on a utilization characteristic of the first wireless device. The operation(s) at block 1210 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the channel availability check assigner 445 or 545 described with reference to FIG. 4 or 5.

At block 1215, the method 1200 may include determining a duration of the first portion of the distributed CAC based at least in part on: a first number of wireless devices in the plurality of wireless devices, or a second number of wireless devices in the plurality of wireless devices capable of performing a portion of the distributed CAC, or a maximum number of wireless devices for performing the distributed CAC. The operation(s) at block 1215 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the channel availability check duration determiner 565 described with reference to FIG. 5.

At block 1220, the method 1200 may include communicating the assignment of the first portion of the distributed CAC to the first wireless device. In some examples, the assignment of the first portion of the distributed CAC may be communicated to the first wireless device over a dedicated radio frequency spectrum band. The operation(s) at block 1220 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the channel availability check communicator 450 or 550 described with reference to FIG. 4 or 5.

At block 1225, the method 1200 may include determining whether an indication the sub-band is unavailable is received during the first portion of the distributed CAC. Upon determining that an indication the sub-band is unavailable is received during the first portion of the distributed CAC at block 1225, the method 1200 may continue at block 1250. Upon determining that an indication the sub-band is unavailable is not received during the first portion of the distributed CAC at block 1225, the method 1200 may continue at block 1230. The operation(s) at block 1225 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the channel availability check evaluator 570 described with reference to FIG. 5.

At block 1230, the method 1200 may include assigning a second portion of the distributed CAC to a second wireless device of the plurality of wireless devices. In some examples, the second portion of the distributed CAC may overlap the first portion of the distributed CAC in time. In some examples, the second portion of the distributed CAC may be contiguous with the first portion of the distributed CAC. Overlapping portions may, for example, provide greater leeway in communicating assigned portions of the distributed CAC to wireless devices. Contiguous portions may, for example, decrease the time that a wireless device needs to cease wireless communication to monitor an energy level of a sub-band during an assigned portion of the distributed CAC. In some examples, the method 1200 may include assigning the second portion of the distributed CAC to the second wireless device based at least in part on a utilization characteristic of the second wireless device. In some examples, the method 1200 may include determining a duration of the second portion of the distributed CAC based at least in part on: the first number of wireless devices in the plurality of wireless devices, or the second number of wireless devices in the plurality of wireless devices capable of performing a portion of the distributed CAC, or the maximum number of wireless devices for performing the distributed CAC. In some examples, the portions of the distributed CAC may be associated with one of: a same duration, or at least two different durations. Dividing a CAC into more portions of smaller duration may decrease the amount of time that a wireless device may need to cease wireless communication and monitor an energy level of the sub-band for an assigned portion of the distributed CAC. Dividing a CAC into fewer portions of longer duration may decrease the management overhead for the distributed CAC, and may also decrease the amount of time that a wireless device may need to cease wireless communication and monitor an energy level of the sub-band for an assigned portion of the distributed CAC. Dividing a CAC into portions of different duration may enable the wireless communication device performing the method 1200 to allocate a greater portion of the CAC to a wireless device with lower utilization than another wireless device. The operation(s) at block 1230 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, the channel availability check assigner 445 or 545 described with reference to FIG. 4 or 5, or the channel availability check duration determiner 565 described with reference to FIG. 5.

At block 1235, the method 1200 may include communicating the assignment of the second portion of the distributed CAC to the second wireless device. In some examples, the assignment of the second portion of the distributed CAC may be communicated to the second wireless device after communicating the assignment of the first portion of the distributed CAC to the first wireless device. Communicating some portions later than others may enable the wireless communication device performing the method 1200 to assign portions of the distributed CAC more dynamically, based on current wireless device utilizations, the success of prior portions of the distributed CAC, etc. In some examples, the assignment of the second portion of the distributed CAC may be communicated to the second wireless device over the dedicated radio frequency spectrum band. The operation(s) at block 1235 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the channel availability check communicator 450 or 550 described with reference to FIG. 4 or 5.

In an alternative to the operation(s) at block 1235, the method 1200 may include performing the second portion of the distributed CAC (i.e., the wireless device performing the method 1200 may be the second wireless device). The method 1200 may alternatively include performing the first portion of the distributed CAC, another portion of the distributed CAC, or no portion of the distributed CAC.

At block 1240, the method 1200 may include determining whether the sub-band is available during all portions of the distributed CAC. In some examples, the determination may be based on at least one indication the sub-band is available (e.g., a first indication the sub-band is available during the first portion of the distributed CAC, received from the first wireless device, or a second indication the sub-band is available during the second portion of the distributed CAC, received from the second wireless device, etc.). Upon determining that the sub-band is not available during all portions of the distributed CAC at block 1240 (e.g., because an indication the sub-band is unavailable during a portion of the distributed CAC is received from a wireless device, or because an indication the sub-band is available is not received from a wireless device), the method 1200 may continue at block 1250. Upon determining that the sub-band is available during all the portions of the distributed CAC at block 1240, the method 1200 may continue at block 1245. The operation(s) at block 1240 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the channel availability check evaluator 570 described with reference to FIG. 5.

At block 1245, the method 1200 may include communicating over the sub-band based at least in part on determining the sub-band is available during all portions of the distributed CAC. The operation(s) at block 1245 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the sub-band selector 455 or 555 described with reference to FIG. 4 or 5.

At block 1250, the method 1200 may include flagging the sub-band unavailable for a period of time. The operation(s) at block 1250 may be performed using the wireless communication manager 420 or 520 described with reference to FIG. 4 or 5, the small cell wireless communication manager 960 described with reference to FIG. 9, the central node wireless communication manager 840 described with reference to FIG. 8, the UE wireless communication manager 1050 described with reference to FIG. 10, or the sub-band flagger 575 described with reference to FIG. 5.

Thus, the method 1200 may provide for wireless communication. It should be noted that the method 1200 is just one implementation and that the operations of the method 1200 may be rearranged or otherwise modified such that other implementations are possible.

Figure 13:
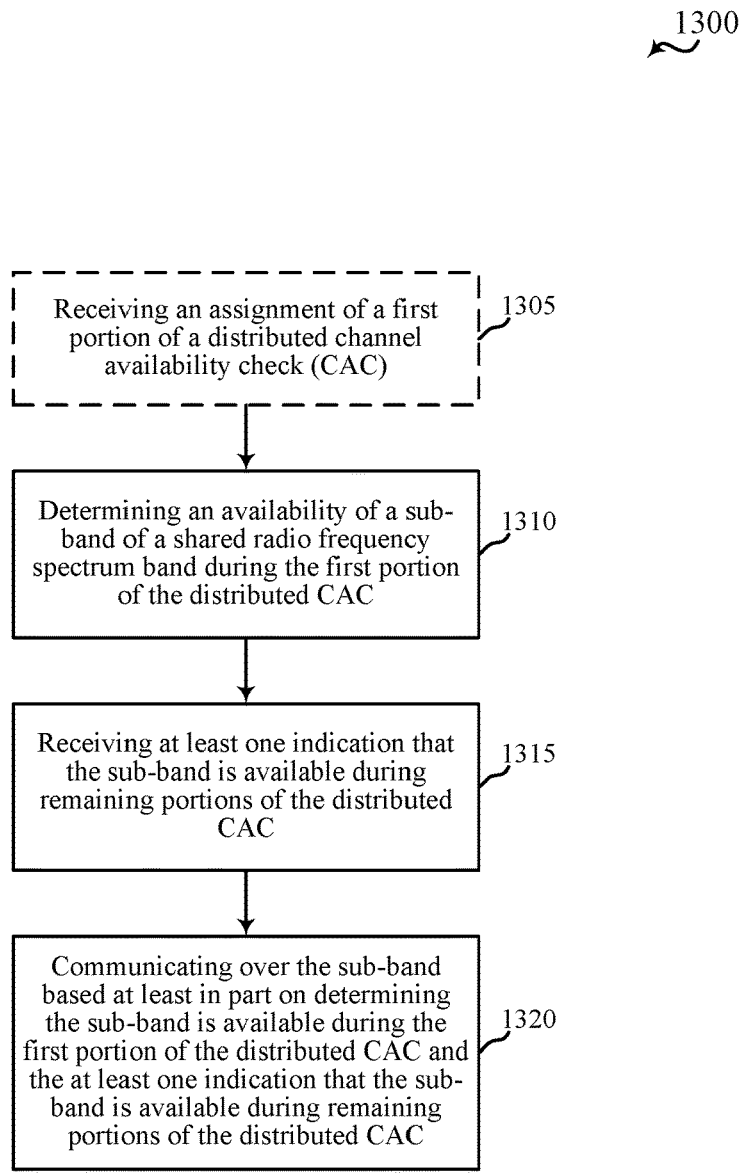
FIG. 13 is a flow chart illustrating an example of a method for wireless communication at a wireless communication device, in accordance with various aspects of the present disclosure.

FIG. 13 is a flow chart illustrating an example of a method 1300 for wireless communication at a wireless communication device, in accordance with various aspects of the present disclosure. For clarity, the method 1300 is described below with reference to a wireless communication device including aspects of one or more of the small cells 135, 235, 235-*a*, 335, 335-*a*, 335-*b*, 335-*c*, or 935 described with reference to FIG. 1, 2, 3, or 9, aspects of one or more of the base stations 105 described with reference to FIG. 1, aspects of one or more of the UEs 115, 215, 215-*a*, 215-*b*, or 1015 described with reference to FIG. 1, 2, or 10, or aspects of one or more of the apparatuses 635 or 735 described with reference to FIG. 6 or 7. In some examples, a wireless communication device may execute one or more sets of codes to control the functional elements of the wireless communication device to perform the functions described below. Additionally or alternatively, the wireless communication device may perform one or more of the functions described below using special-purpose hardware.

At block 1305, the method 1300 may optionally include receiving an assignment of a first portion of a distributed CAC from another wireless communication device. In some examples, the assignment of the first portion of the distributed CAC may be received over a dedicated radio frequency spectrum band. The first portion of the distributed CAC may or may not be a temporally first portion of the distributed CAC. The operation(s) at block 1305 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the channel availability check assignment identifier 640 or 740 described with reference to FIG. 6 or 7.

At block 1310, the method 1300 may include determining an availability of a sub-band of a shared radio frequency spectrum band during the first portion of the distributed CAC. The operation(s) at block 1310 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the sub-band availability determiner 645 or 745 described with reference to FIG. 6 or 7.

At block 1315, the method 1300 may include receiving at least one indication that the sub-band is available during remaining portions of the distributed CAC. In some examples, the method 1300 may include receiving an indication the sub-band is determined available during at least a second portion of the distributed CAC. In some examples, the indication the sub-band is determined available during at least the second portion of the distributed CAC may be received from a network access device (e.g., a base station or small cell). The operation(s) at block 1315 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the sub-band availability determiner 645 or 745 described with reference to FIG. 6 or 7.

At block 1320, the method 1300 may include communicating over the sub-band based at least in part on determining the sub-band is available during the first portion of the distributed CAC and the at least one indication that the sub-band is available during remaining portions of the distributed CAC. The operation(s) at block 1320 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the sub-band selector 650 or 750 described with reference to FIG. 6 or 7.

Thus, the method 1300 may provide for wireless communication. It should be noted that the method 1300 is just one implementation and that the operations of the method 1300 may be rearranged or otherwise modified such that other implementations are possible.

Figure 14:
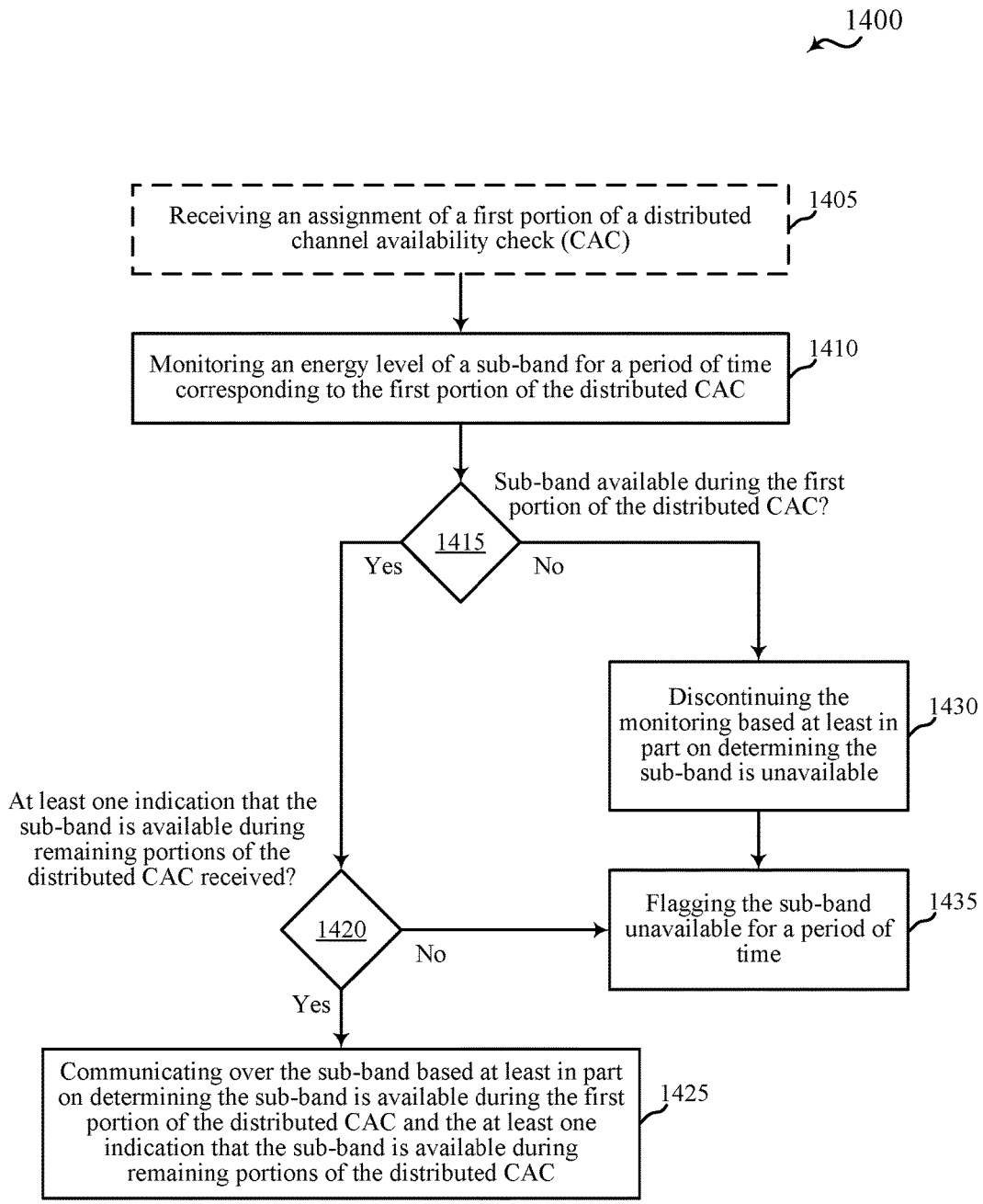
FIG. 14 is a flow chart illustrating an example of a method for wireless communication at a wireless communication device, in accordance with various aspects of the present disclosure.

FIG. 14 is a flow chart illustrating an example of a method 1400 for wireless communication at a wireless communication device, in accordance with various aspects of the present disclosure. For clarity, the method 1400 is described below with reference to a wireless communication device including aspects of one or more of the small cells 135, 235, 235-*a*, 335, 335-*a*, 335-*b*, 335-*c*, or 935 described with reference to FIG. 1, 2, 3, or 9, aspects of one or more of the base stations 105 described with reference to FIG. 1, aspects of one or more of the UEs 115, 215, 215-*a*, 215-*b*, or 1015 described with reference to FIG. 1, 2, or 10, or aspects of one or more of the apparatuses 635 or 735 described with reference to FIG. 6 or 7. In some examples, a wireless communication device may execute one or more sets of codes to control the functional elements of the wireless communication device to perform the functions described below. Additionally or alternatively, the wireless communication device may perform one or more of the functions described below using special-purpose hardware At block 1405, the method 1400 may optionally include receiving an assignment of a first portion of a distributed CAC from another wireless communication device. In some examples, the assignment of the first portion of the distributed CAC may be received over a dedicated radio frequency spectrum band. The first portion of the distributed CAC may or may not be a temporally first portion of the distributed CAC. The operation(s) at block 1405 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the channel availability check assignment identifier 640 or 740 described with reference to FIG. 6 or 7.

At block 1410, the method 1400 may include monitoring an energy level of a sub-band of a shared radio frequency spectrum band for a period of time corresponding to the first portion of the distributed CAC. The period of time for which the energy level of the sub-band is monitored may be less than a duration of the distributed CAC, thereby decreasing the time that the wireless device performing the method 1400 may need to cease wireless communication to perform the monitoring. The operation(s) at block 1410 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the sub-band energy level monitor 755 described with reference to FIG. 7.

At block 1415, the method 1400 may include determining whether the sub-band is available during the first portion of the distributed CAC based at least in part on the monitoring at block 1410. Upon determining that the sub-band is unavailable during the first portion of the distributed CAC at block 1415 (e.g., by detecting energy on the sub-band, by detecting energy on the sub-band exceeding a threshold energy, or by detecting energy on the sub-band for greater than a threshold time period), the method 1400 may continue at block 1430. Upon determining that the sub-band is available during the first portion of the distributed CAC at block 1415, the method 1400 may continue at block 1420. The operation(s) at block 1415 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the sub-band availability determiner 645 or 745 described with reference to FIG. 6 or 7.

At block 1420, the method 1400 may include determining whether at least one indication that the sub-band is available during remaining portions of the distributed CAC is received. By receiving one or more indications that the sub-band is determined available during remaining portions of the distributed CAC, the wireless device performing the method 1400 may not need to cease wireless communication to monitor an energy level of the sub-band during the remaining portions. In some examples, an indication the sub-band is determined available during at least the second portion of the distributed CAC may be received from a network access device (e.g., a base station or small cell). When a distributed CAC is managed by a network access device (or other network device), the network access device (or other network device) may transmit indications of sub-band availability to any or all of the wireless devices within the geographic area for which the distributed CAC is performed. Upon determining that the at least one indication is not received at block 1420, the method 1400 may continue at block 1435. Upon determining that the at least one indicator is received at block 1420, the method 1400 may continue at block 1425. The operation(s) at block 1420 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the sub-band availability determiner 645 or 745 described with reference to FIG. 6 or 7.

At block 1425, the method 1400 may include communicating over the sub-band based at least in part on determining the sub-band is available during the first portion of the distributed CAC and the at least one indication that the sub-band is available during remaining portions of the distributed CAC. The operation(s) at block 1425 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the sub-band selector 650 or 750 described with reference to FIG. 6 or 7.

At block 1430, the method 1400 may include discontinuing the monitoring at block 1410 based at least in part on determining the sub-band is unavailable at block 1415. Discontinuing the monitoring before the end of the first portion of the distributed CAC may enable early termination of the distributed CAC, and in some examples may enable other apparatuses to forego performance of portions of the distributed CAC that no longer matter (e.g., another portion of the distributed CAC may not matter if the distributed CAC will fail regardless of whether the other portion is successfully performed). The operation(s) at block 1430 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the sub-band energy level monitor 755 described with reference to FIG. 7.

At block 1435, the method 1400 may include flagging the sub-band unavailable for a period of time. The operation(s) at block 1435 may be performed using the wireless communication manager 620 or 720 described with reference to FIG. 6 or 7, the small cell wireless communication manager 960 described with reference to FIG. 9, the UE wireless communication manager 1050 described with reference to FIG. 10, or the sub-band flagger 760 described with reference to FIG. 7.

Thus, the method 1400 may provide for wireless communication. It should be noted that the method 1400 is just one implementation and that the operations of the method 1400 may be rearranged or otherwise modified such that other implementations are possible.

In some examples, aspects of the methods 1100, 1200, 1300, or 1400 described with reference to FIG. 11, 12, 13, or 14 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may, additionally or alternatively, be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may, additionally or alternatively, be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a wireless device, comprising:
providing an indication that the wireless device supports distributed channel availability check (CAC) and is within a geographic coverage area comprising one or more small cell radii;
receiving an assignment of a first portion of the distributed CAC based at least in part on the indication;
determining an availability of a sub-band of a shared radio frequency spectrum band during the first portion of the distributed CAC based at least in part on the assignment;
receiving at least one indication that the sub-band is available during remaining portions of the distributed CAC; and
communicating over the sub-band based at least in part on determining the sub-band is available during the first portion of the distributed CAC and the at least one indication that the sub-band is available during remaining portions of the distributed CAC.

2. The method of claim 1, further comprising:
monitoring an energy level of the sub-band for a period of time corresponding to the first portion of the distributed CAC; and
determining the availability of the sub-band based at least in part on the monitoring.

3. The method of claim 2, further comprising:
determining the sub-band is unavailable during the first portion of the distributed CAC; and
discontinuing the monitoring based at least in part on the determining the sub-band is unavailable.

4. The method of claim 1, further comprising:
receiving an indication the sub-band is determined available during at least a second portion of the distributed CAC.

5. The method of claim 4, wherein the indication the sub-band is determined available during at least the second portion of the distributed CAC is received from a network access device.

6. A method for wireless communication, comprising:
identifying a plurality of wireless devices within a geographic coverage area comprising one or more small cell radii;
determining a subset of the plurality of wireless devices capable of performing a distributed channel availability check (CAC);
assigning a first portion of the CAC to a first wireless device of the subset of the plurality of wireless devices based at least in part on the subset satisfying a threshold, the distributed CAC associated with a sub-band of a shared radio frequency spectrum band;
communicating the assignment of the first portion of the distributed CAC to the first wireless device; and
communicating over the sub-band based at least in part on receiving an indication the sub-band is determined available during the first portion of the distributed CAC and determining the sub-band is available during remaining portions of the distributed CAC.

7. The method of claim 6, further comprising:
determining a duration of the first portion of the distributed CAC based at least in part on: a first number of wireless devices in the plurality of wireless devices, or a second number of wireless devices in the plurality of wireless devices capable of performing a portion of the distributed CAC, or a maximum number of wireless devices for performing the distributed CAC.

8. The method of claim 6; further comprising:
receiving an indication the sub-band is unavailable during a portion of the distributed CAC; and
flagging the sub-band unavailable for a period of time.

9. The method of claim 6, further comprising:
assigning the first portion of the distributed CAC to the first wireless device based at least in part on a utilization characteristic of the first wireless device.

10. The method of claim 6, further comprising:
assigning a second portion of the distributed CAC to a second wireless device of the plurality of wireless devices based at least in part on a utilization characteristic of the second wireless device.

11. The method of claim 10, wherein the second portion of the distributed CAC overlaps the first portion of the distributed CAC in time.

12. The method of claim 10, wherein the second portion of the distributed CAC is contiguous with the first portion of the distributed CAC in time.

13. The method of claim 10, further comprising:
communicating the assignment of the second portion of the distributed CAC to the second wireless device after communicating the assignment of the first portion of the distributed CAC to the first wireless device.

14. The method of claim 6, further comprising:
identifying the plurality of wireless devices within a geographic area based at least in part on location-based metrics for the plurality of wireless devices.

15. The method of claim 6, further comprising:
performing a second portion of the distributed CAC.

16. The method of claim 6, wherein the assignment of the first portion of the distributed CAC is communicated to the first wireless device over a dedicated radio frequency spectrum band.

17. The method of claim 6, wherein the first portion of the distributed CAC and the remaining portions of the distributed CAC are associated with one of:
a same duration, or at least two different durations.

18. An apparatus for wireless communication, comprising:
a processor; and
memory in electronic communication with the processor;
the processor and the memory configured to:
provide an indication that the wireless device supports distributed channel availability check (CAC) and is within a geographic coverage area comprising one or more small cell radii;
receive an assignment of a first portion of the distributed CAC based at least in part on the indication;
determine an availability of a sub-band of a shared radio frequency spectrum band during the first portion of the distributed CAC based at least in part on the assignment;
receive at least one indication that the sub-band is available during remaining portions of the distributed CAC; and
communicate over the sub-band based at least in part on determining the sub-band is available during the first portion of the distributed CAC and the at least one indication that the sub-band is available during remaining portions of the distributed CAC.

19. The apparatus of claim 18, wherein the processor and the memory are configured to:
monitor an energy level of the sub-band for a period of time corresponding to the first portion of the distributed CAC; and
determine the availability of the sub-band based at least n part on the monitoring.

20. The apparatus of claim 19, wherein the processor and the memory are configured to:
determine the sub-band is unavailable during the first portion of the distributed CAC; and
discontinue the monitoring based at least in part on the determining the sub-band is unavailable.

21. The apparatus of claim 18, wherein the processor and the memory are configured to:
receive an indication the sub-band is determined available during at least a second portion of the distributed CAC.

22. The apparatus of claim 21, wherein the indication the sub-band is determined available during at least the second portion of the distributed CAC is received from a network access device.

23. An apparatus for wireless communication, comprising:
a processor; and
memory in electronic communication with the processor; the processor and the memory configured to:
identify a plurality of wireless devices within a geographic coverage area comprising one or more small cell radii;
determine a subset of the plurality of wireless devices capable of performing a distributed channel availability check (CAC);
assign a first portion of the CAC to a first wireless device of the subset of the plurality of wireless devices based at least in part on the subset satisfying a threshold, the distributed CAC associated with a sub-band of a shared radio frequency spectrum band;
communicate the assignment of the first portion of the distributed CAC to the first wireless device; and
communicate over the sub-band based at least in part on receiving an indication the sub-band is determined available during the first portion of the distributed CAC and determining the sub-band is available during remaining portions of the distributed CAC.

24. The apparatus of claim 23, wherein the processor and the memory are configured to:
determine a duration of the first portion of the distributed CAC based at least in part on: a first number of wireless devices in the plurality of wireless devices, or a second number of wireless devices in the plurality of wireless devices capable of performing a portion of the distributed CAC, or a maximum number of wireless devices for performing the distributed CAC.

25. The apparatus of claim 23, wherein the processor and the memory are configured to:
receive an indication the sub-band is unavailable during a portion of the distributed CAC; and
flag the sub-band unavailable for a period of time.

26. The apparatus of claim 23, wherein the processor and the memory are configured to:
assign the first portion of the distributed CAC to the first wireless device sed at least in part on a utilization characteristic of the first wireless device.

27. The apparatus of claim 23, wherein the processor and the memory are configured to:
assign a second portion of the distributed CAC to a second wireless device of the plurality of wireless devices based at least in part on a utilization characteristic of the second wireless device.

28. The apparatus of claim 27, wherein the second portion of the distributed CAC overlaps the first portion of the distributed CAC in time.

29. The apparatus of claim 27, wherein the second portion of the distributed CAC overlaps the first portion of the distributed CAC in time.

30. The apparatus of claim 27, wherein the processor and the memory are configured to:
communicate the assignment of the second portion of the distributed CAC to the second wireless device after communicating the assignment of the first portion of the distributed CAC to the first wireless device.

* * * * *